United States Patent
Di Girolamo et al.

(10) Patent No.: US 11,134,543 B2
(45) Date of Patent: Sep. 28, 2021

(54) INTERWORKING LPWAN END NODES IN MOBILE OPERATOR NETWORK

(71) Applicant: CONVIDA WIRELESS, LLC, Wilmington, DE (US)

(72) Inventors: Rocco Di Girolamo, Laval (CA); Michael F. Starsinic, Newtown, PA (US); Hongkun Li, Malvern, PA (US); Catalina Mihaela Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 97 days.

(21) Appl. No.: 16/498,062

(22) PCT Filed: Mar. 30, 2018

(86) PCT No.: PCT/US2018/025322
§ 371 (c)(1),
(2) Date: Sep. 26, 2019

(87) PCT Pub. No.: WO2018/183789
PCT Pub. Date: Oct. 4, 2018

(65) Prior Publication Data
US 2020/0107402 A1    Apr. 2, 2020

Related U.S. Application Data

(60) Provisional application No. 62/479,813, filed on Mar. 31, 2017.

(51) Int. Cl.
*H04W 88/16* (2009.01)
*H04L 29/08* (2006.01)
*H04W 48/00* (2009.01)

(52) U.S. Cl.
CPC ......... *H04W 88/16* (2013.01); *H04L 67/1004* (2013.01); *H04L 67/1046* (2013.01); *H04L 67/16* (2013.01); *H04W 48/17* (2013.01)

(58) Field of Classification Search
None
See application file for complete search history.

(56) References Cited

U.S. PATENT DOCUMENTS

| 10,321,397 | B2 * | 6/2019 | Gandhi | ............. H04W 52/0216 |
| 2011/0271005 | A1 * | 11/2011 | Bharrat | ............... H04L 65/1063 709/232 |

(Continued)

FOREIGN PATENT DOCUMENTS

| WO | 2016/005371 A1 | 1/2016 |
| WO | 2018/093638 A1 | 5/2018 |

OTHER PUBLICATIONS

"http://www.link-labs.com/use-cases-and-considerations-for-lorawan/" Jun. 20, 2016.

(Continued)

*Primary Examiner* — Lonnie V Sweet
(74) *Attorney, Agent, or Firm* — BakerHostetler

(57) ABSTRACT

It is recognized herein that current cellular radio access technologies lack capabilities for both long range and low power usage devices. Public LPWAN networks are described herein that may use multiple network servers. Further, the network may distribute IoT devices (e.g., LoRa end nodes) across network servers. This may allow the public IoT networks to balance loads across network servers, to allow for redundancy of network servers, to provide differentiated services across network servers, and to permit roaming of end nodes across different public IoT networks, among other things.

13 Claims, 25 Drawing Sheets

(56) References Cited

U.S. PATENT DOCUMENTS

| | | | | |
|---|---|---|---|---|
| 2013/0318239 | A1* | 11/2013 | Scharf | H04L 43/04 |
| | | | | 709/224 |
| 2016/0345265 | A1 | 11/2016 | Lee et al. | |
| 2017/0164187 | A1* | 6/2017 | Lu | H04W 8/24 |
| 2018/0139274 | A1* | 5/2018 | Gandhi | H04W 4/70 |
| 2018/0262340 | A1* | 9/2018 | Lee | H04L 63/126 |
| 2019/0053180 | A1* | 2/2019 | Lalam | H04J 3/0635 |
| 2019/0280952 | A1* | 9/2019 | Sizer | H04L 43/065 |
| 2020/0119969 | A1* | 4/2020 | Niederfeld | H04L 63/0823 |

OTHER PUBLICATIONS

3GPP TS 23.501 V0.1.1, "3rd Generation Partnership Project; Technical Specification Group Services and System Aspects; System Architecture for the 5G System; Stage 2 (Release 15)", Jan. 2017, 67 pages.

Miller, MWR Labs Whitepaper, "LoRa Security Building a Secure LoRa Solution", Mar. 22, 2016, 18 pages.

Sornin et al., LoRa Alliance, "LoRaWAN TM Specification Version 1.0.2", Jul. 2016, 70 pages.

* cited by examiner

INTERWORKING LPWAN END NODES IN MOBILE OPERATOR NETWORK

CROSS-REFERENCE TO RELATED APPLICATIONS

This application is the National Stage Application of International Patent Application no. PCT/US2018/025322 filed Mar. 30, 2018, which claims the benefit of U.S. Provisional Patent Application Ser. No. 62/479,813 filed Mar. 31, 2017 the disclosure of which is hereby incorporated by reference as if set forth in its entirety herein.

BACKGROUND

A large segment of IoT devices may have the dual requirements of being extremely power limited and requiring long range. As a result, traditional technologies used for IoT are often not well suited to meet these requirements. For instance, although ZigBee and Bluetooth LE may meet a particular power requirement, they are not long range technologies. Similarly, by way of another example, WiFi may meet the long range requirement, but it has difficulty meeting the power limitations. Consequently a new class of access network, for instance the Low-Power Wide Area Network (LPWAN) is being proposed to address these two requirements. A number of technologies may fall under this category, such as, for example, Long Range (LoRa), Sigfox, and Weightless.

LoRa and LoRa Wide Area Network (LoRaWAN) define the physical layer (PHY) and Media Access Control (MAC) layer, respectively, for LPWAN technology. LoRa is a proprietary protocol. It relies on chirp spread spectrum (CSS) modulation to achieve the desired receiver sensitivity. On top of the LoRa PHY, the LoRa Alliance has defined the LoRaWAN MAC. This layer defines the basic architecture of a LoRa network, as well as a procedure for uplink and downlink transmissions.

Referring to FIG. 1, an example architecture of an example LoRa network 100 is shown. The basic architecture of the LoRa network 100 is in the form of a star-of-stars, where end nodes (ENs) 102 communicate to gateways (GWs) 104 using LoRa modulation, and the GWs 104 communicate to a single network server (NS) 106. The NS 106 controls the overall network and provides communication to any external data networks 108. As shown, communication between each GW 104 and the NS 106 is through an IP connection.

Still referring to FIG. 1, end node transmissions may be received by one or more gateways 104. All of the gateways 104 will pass on these transmissions, as well as an indication of the received signal strength (RSS) of these transmissions, to the network server 106. The network server 106 is responsible for eliminating duplicate receptions, and acknowledging the transmission (if an acknowledgement was requested by the end node 102). The network server 106 is also responsible for selecting which of the potential gateways 104 is to be used for sending any downlink (DL) transmission to a particular end node 102. As shown, the network server 106 receives uplink transmissions from multiple gateways 104, but it might only send downlink transmissions from a single gateway.

User plane data (known as application-specific data in the LoRaWAN specification) is carried in MAC frames between the end nodes 102 and the network server 106. MAC frames are also used to transmit control plane data (known as Control Commands in the LoRaWAN specification) between the end nodes 102 and the network server 106. The control plane data is somewhat limited, and allows the network to adaptively change the data rate to/from the end node. The control plane information can be carried in dedicated MAC control frames, or piggybacked in a MAC header. The PHY frame has a preamble, a header, a header Cyclic Redundancy Check (CRC), and a PHY payload. The PHY payload is used to carry the user plane and control plane data.

Referring also to FIG. 2, in order to participate in a network, for instance the network 100, the end nodes 102 must "join" the network. This allows a particular end node 102 to be given a network address (NwkAddr), and to establish security keys. An example Join procedure is depicted in FIG. 2.

Referring to FIG. 2, a Join request 202 may include an Application Extended Unique Identifier (AppEUI), a Device Extended Unique Identifier (DevEUI), and a device nonce. In an example, the nonce may be an arbitrary/random number that is used once. Multiple gateways 104 receive the Join request 202 and forward the message to the network server 106. At 204, the server 106 checks whether the end node 102 is allowed to join the network (e.g., using an Application Extended Unique Identifier (AppEUI), a Device Extended Unique Identifier (DevEUI) and an Application Key (AppKey)). If the end node 102 is permitted to join the network, the network server 106 responds with a Join Accept 206, which contains the Device Address (DevAddr) within the LoRaWAN network, a network ID, some network information, and an application nonce. The network server 106 chooses the gateway 104 (e.g., GW2) that will package the Join Accept message 206 in a LoRa frame 208, and forward this frame 208 to the end node 102.

The LoRaWAN protocol provides both message integrity (signing) and encryption for parts of LoRaWAN packets. These are performed using symmetric keys known both to the end node 102 and to the network server 106. These keys are derived during the Join procedure (a process known as Over-the-Air-Activation). LoRaWAN networks use a combination of data encryption and message signing.

LoRaWAN end nodes are categorized in different classes (A, B, and C). Devices (e.g., end nodes) are Class A, but some may additionally support Class B or Class C.

Referring now to FIG. 3, Class A devices include bidirectional devices with the lowest power consumption and potentially high latency for downlink communication. These devices can send uplink transmissions when necessary (e.g., using an Aloha-like access mechanism), but can only receive downlink transmissions in two small receive windows following an uplink transmission. An Aloha-like media access protocol (MAC) generally refers to a MAC in which the devices communicate at will when they have traffic to send. This protocol does not use any carrier sensing to prevent collisions. Any collision detection and retransmissions are to be handled by higher layers. The example receive windows are denoted by RX1 and RX2 in FIG. 3. Thus, DL transmissions to an end node may need to be buffered in the network, while waiting for the next potential receive window for that end node. An end node may be notified that there are additional DL transmissions, through a bit in the DL MAC header. This signals to the end node that the network server has more data for the end node, and that the end node should start an uplink transmission to open up additional receive windows.

Referring to FIG. 4, Class B devices include bidirectional devices that trade some power consumption for lower downlink latency. These devices are also battery powered, but have a shorter lifespan than that of Class A devices. In addition to opening two receive windows after every uplink transmission, these devices have regularly scheduled receive windows. The schedule of these receive windows is known to the network. It can be configured from once every second, to once every 128 seconds. The gateways are time synchronized and send out a beacon that is used by the end nodes to determine the timing of the receive windows. The beacon has a period of 128 seconds. It is generated by the gateway and includes a timing reference, a network identifier, and the gateway GPS coordinates.

Referring to FIG. 5, Class C devices include bidirectional devices that are typically geared to use cases requiring the lowest possible downlink latency. These devices have nearly continuous open receive windows. In particular, the only time they are not listening for DL transmissions is when they are transmitting.

A sender (e.g., end node or network server) in a LoRaWAN, may ask that a transmission be confirmed. In such cases, the receiving node is required to respond with a data frame that has its Acknowledgement (ACK) bit set. The end node can send the ACK at its own discretion, while the network server is required to wait for a receive window to send its ACK. If an ACK is expected and not received, the message may be retransmitted. If the maximum number of retransmissions has been attempted, the application is responsible for deciding if it wants to try to adapt the data rate so that the transmission can have a longer range. Alternatively, the application can decide to abandon the transmission.

LoRa defines that control commands, which are a form of Control plane signaling, are carried over MAC messages, either directly in a MAC payload, or in the MAC header. The control commands may be used to, for example: check the link quality; request an end node to change data rate, transmit power, repetition rate, or channel; set duty cycle (applicable for the European Union); set the receive window parameters; create or modify the channels; etc.

Cellular operators often provide service for IoT devices. It is recognized herein, however, that cellular radio access technologies (e.g., LTE, 5G) lack capabilities for both long range and low power usage devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

As described above, it is recognized herein that current cellular radio access technologies lack capabilities for both long range and low power usage devices. Public LPWAN networks are described herein that may use multiple network servers. Further, the network may distribute IoT devices (e.g., LoRa end nodes) across network servers. This may allow the public IoT networks to balance loads across network servers, to allow for redundancy of network servers, to provide differentiated services across network servers, and to permit roaming of end nodes across different public IoT networks.

In an example embodiment, an apparatus, for instance a network server in a low power wide area network (LPWAN), may receive a join request, via a gateway, from an end node. Based on the join request, the network server may determine a new network server to manage the end node. The join request may include an indication of the network server that is preferred by the end node. Further, the join request may include an indication of a class of the end node. In an example, the apparatus receives the join request via a plurality of gateways, and the apparatus may receive a received signal strength (RSS) indication from each of the plurality of gateways, such that each gateway is associated with a respective RSS. Based on the RSS indications, the apparatus may select a gateway from the plurality of gateways to serve the end node. Further, the apparatus may send a Join accept message, via the selected gateway, to the end node during a receive window of the end node.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 16, which includes

DETAILED DESCRIPTION OF ILLUSTRATIVE EMBODIMENTS

As an initial matter, embodiments are often described herein in the context of a Long Range (LoRa) Wide Area Network (LoRaWAN) for purposes of example, but it will be understood that the embodiments are not limited to LoRaWAN, and may apply to various Low-Power Wide Area Networks (LPWAN) technologies as desired. Various terms such as end nodes, gateways, and network servers, unless otherwise specified, are not intended to be limiting such that, various embodiments described herein may be implemented by future Radio Access Technologies (RATs), for example, RATs that may be defined by 3GPP for LPWAN use cases. As used herein, unless otherwise specified, a network server refers to an entity managing an LoRaWAN network. For example, the network server may control end nodes that are allowed to join the network, and can adapt the data rate from the end nodes. As used herein, unless otherwise specified, a public internet of things (IoT) network generally refers to an IoT network that provides service to multiple end customers, wherein each customer may have their own set of end nodes. Public IoT networks may be typically deployed by an operator. Unless otherwise specified, a private IoT network refers to an IoT network typically deployed by a single customer for a specific goal (e.g., smart metering).

Figure 6:
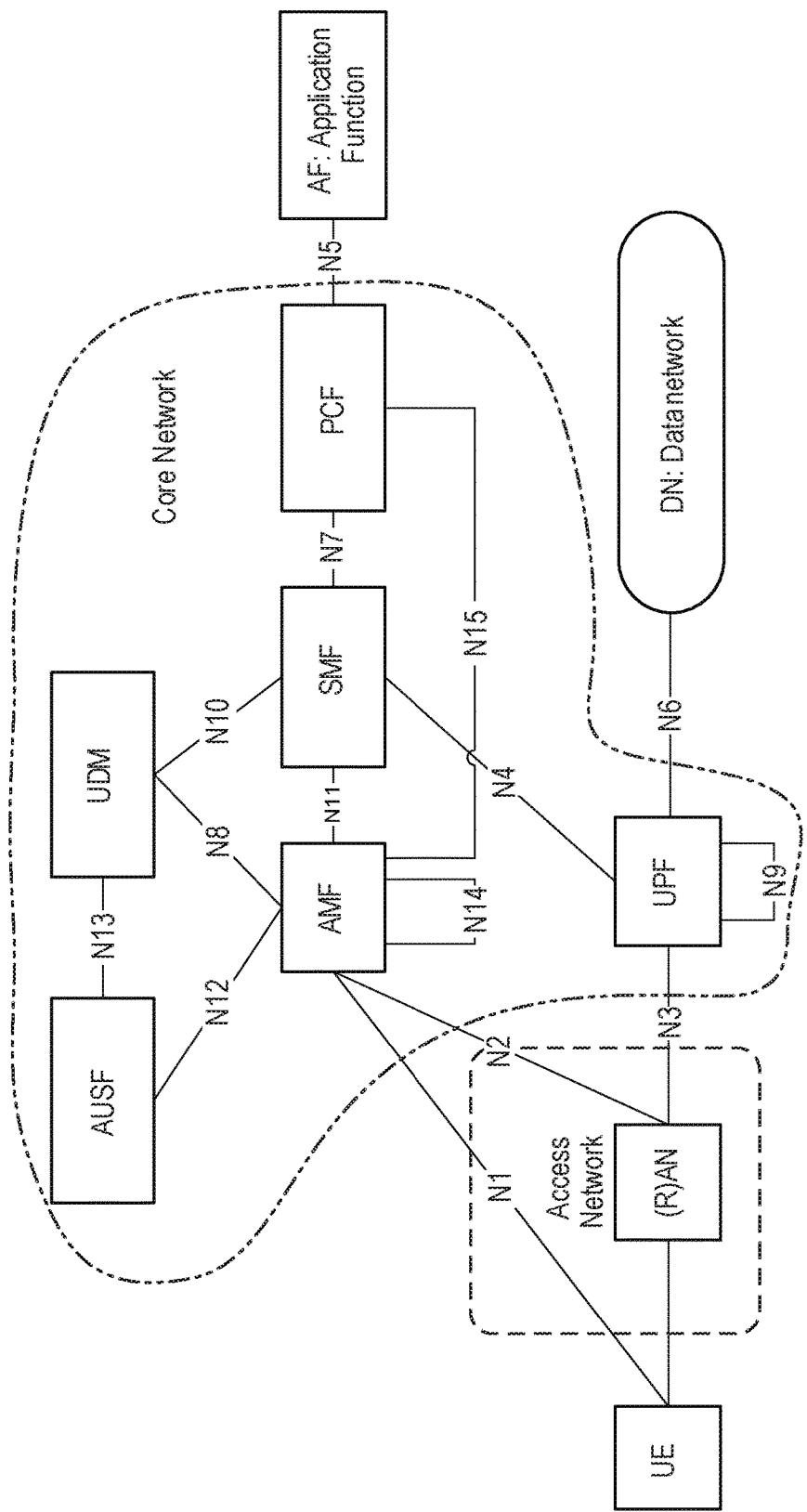
FIG. 6 is an example depiction of a 5G system architecture.

Referring to FIG. 6, it is recognized herein that the next generation 5G architecture may have a modularized function to enable efficient network slicing. The architecture may rely heavily on concepts of network functions, virtualization, and software defined networking. This may permit the network to offer network slices geared to specific use cases, such as massive IoT for example. Still referring to FIG. 6, the following network functions have been defined, for example: Authentication Server Function (AUSF). Core Access and Mobility Management Function (AMF), Data Storage network Function (DSF), Network Exposure Function (NEF), NF Repository Function (NRF), Policy Control Function (PCF), Session Management Function (SMF), Unified Data Management (UDM), User Plane Function (UPF). An example reference architecture 600 is depicted in FIG. 6, and the reference architecture 600 shows how these network functions are related through reference points.

It is recognized herein that interfaces in the next generation architecture may be designed to minimize dependencies between the Access Network (AN) and the Core Network (CN). Thus, the architecture is defined with a converged access-agnostic core network with a common AN-CN interface, which integrates different 3GPP and non-3GPP access types.

Cellular operators often provide service for IoT devices. It is recognized herein, however, that cellular radio access technologies (e.g., LTE, 5G) are typically not geared for both long range and low power usage. In some cases, cellular operators may use IP to communicate with IoT devices using new LPWAN technologies. But, in those cases, the operators might only control one end of the communication link. By way of example, the cellular operator may offer a service that allows its users to use their cellular devices to send an actuator command to open a lock that communicates over a LoRaWAN network. Because the lock uses the LoRaWAN network, the cellular operator cannot guarantee this service.

Figure 7:
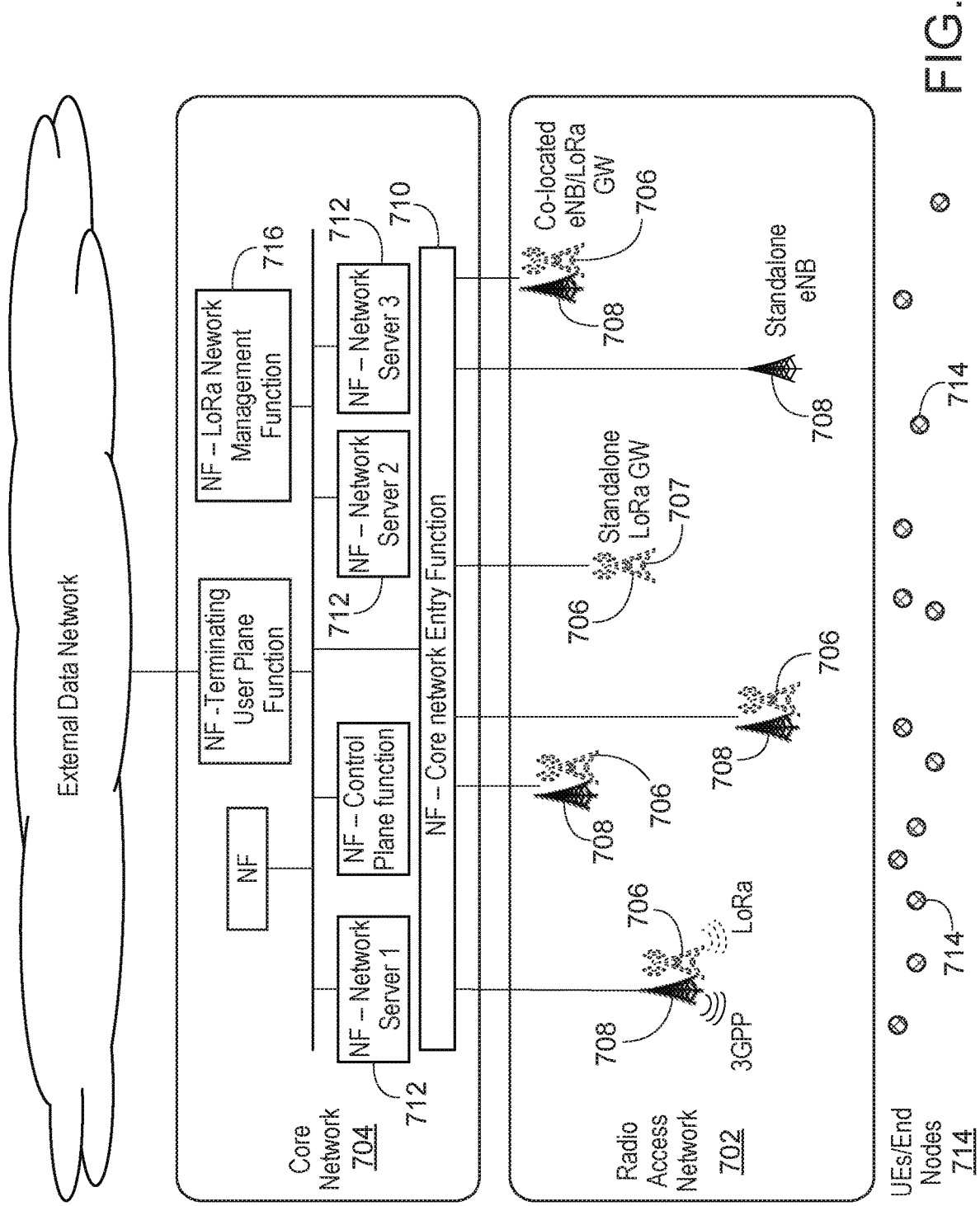
FIG. 7 depicts an example LPWAN network.

Referring now to FIG. 7, an example use case is now described to identify and address issues associated with cellular operators and IoT devices. FIG. 7 shows an LPWAN of a mobile operator. In the example use case, a mobile operator (Operator A) decides to leverage its existing infrastructure, for instance its radio access network 702, to deploy a nationwide public LoRa network that is interworked with its Next Generation core network 704. This may allow Operator A to offer true end-to-end services and control both ends of the communication link. As shown, gateways 706 may be placed alongside the operator's already installed base of eNBs 708, for example, to reduce capital and operating expenditure cost. Operator A may also deploy gateways 706 that are standalone LoRa gateways 707 to eliminate any coverage holes. The core network 704 may have an entry function 710 that allows communication between the core network 704 and the radio access network (RAN) 702. For control plane traffic, this entry function may be a Core Network Access and Mobility Management Function (AMF). For user plane traffic, this entry function may be a User Plane Function (UPF). In some cases, Operator A needs to have multiple network servers 712. In an example, each of these network servers 712 provide different LoRaWAN capabilities. For instance, one network server 712 may be geared toward the end nodes 714 that require some limited guaranteed quality of service (QoS). By way of further example, another of the network servers 712 may be tailored to end nodes 714 that are uplink (UL) only, and yet another network server 712 may be for all the remaining nodes 714. It will be understood that although three network servers 712 are depicted in FIG. 7, this depiction is simplified for purposes of example, and any number of network servers 712 may be implemented in the core network 704 as desired. Further, the multiple network servers 712 may allow the operator to balance the expected load (for example storage of end node context) across the servers 712. The network servers 712 may also be used to provide redundancy, for example, to combat single point of failure issues. The network server functionality may be implemented as an operator network function (NF). In addition, a LoRa Network Management function 716 may be deployed to assist the LoRa network, and to offer some value added services to the gateways 706, network servers 712, and end nodes 714.

Figure 1:
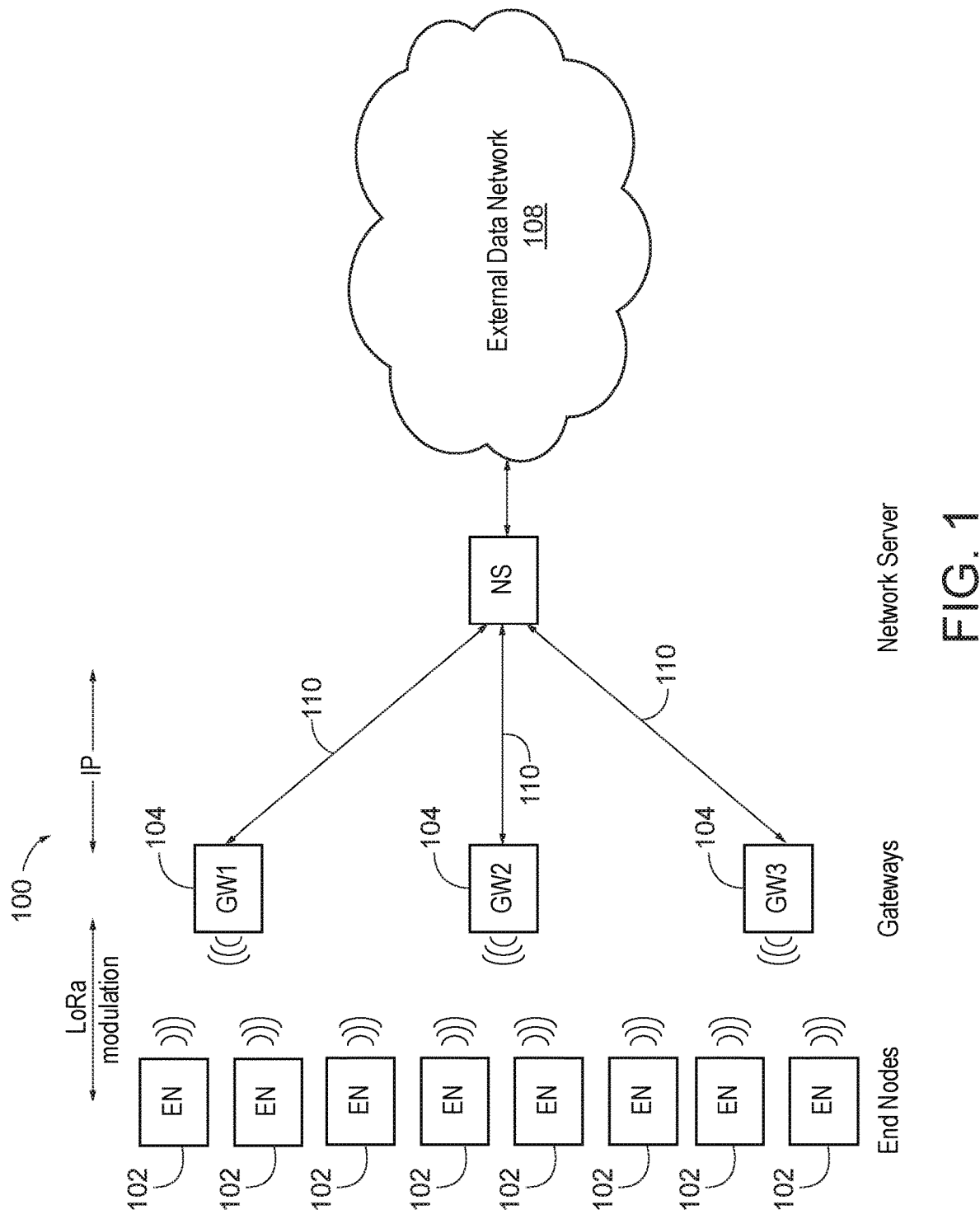
FIG. 1 depicts an example LoRaWAN network architecture.
Figure 2:
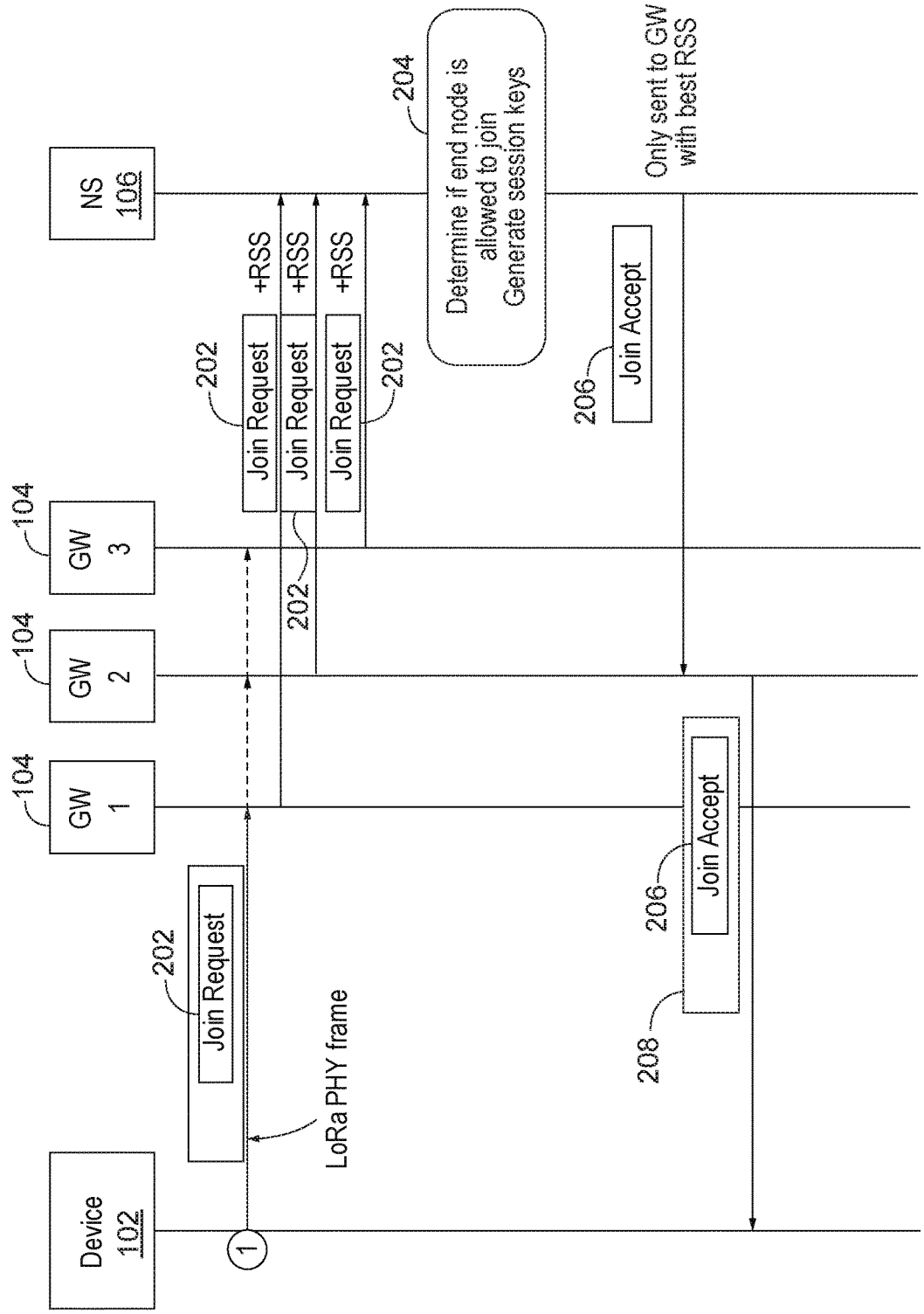
FIG. 2 is call flow for an example Join procedure.
Figure 3:
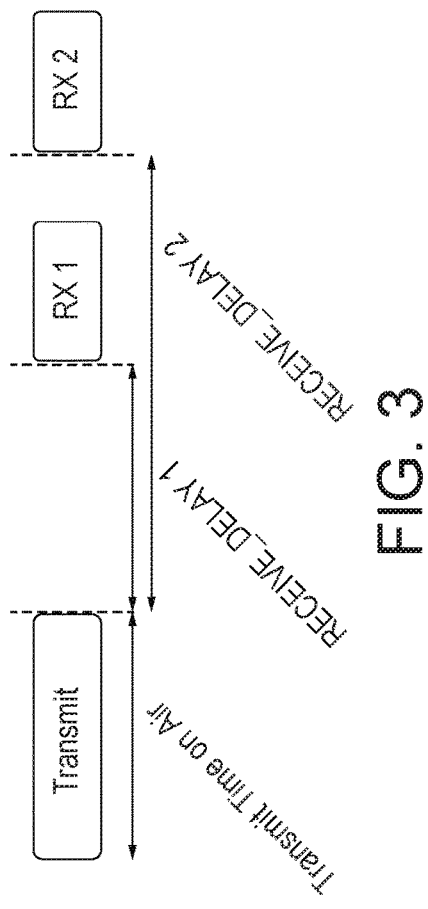
FIG. 3 depicts an example communication for a Class A device.
Figure 4:
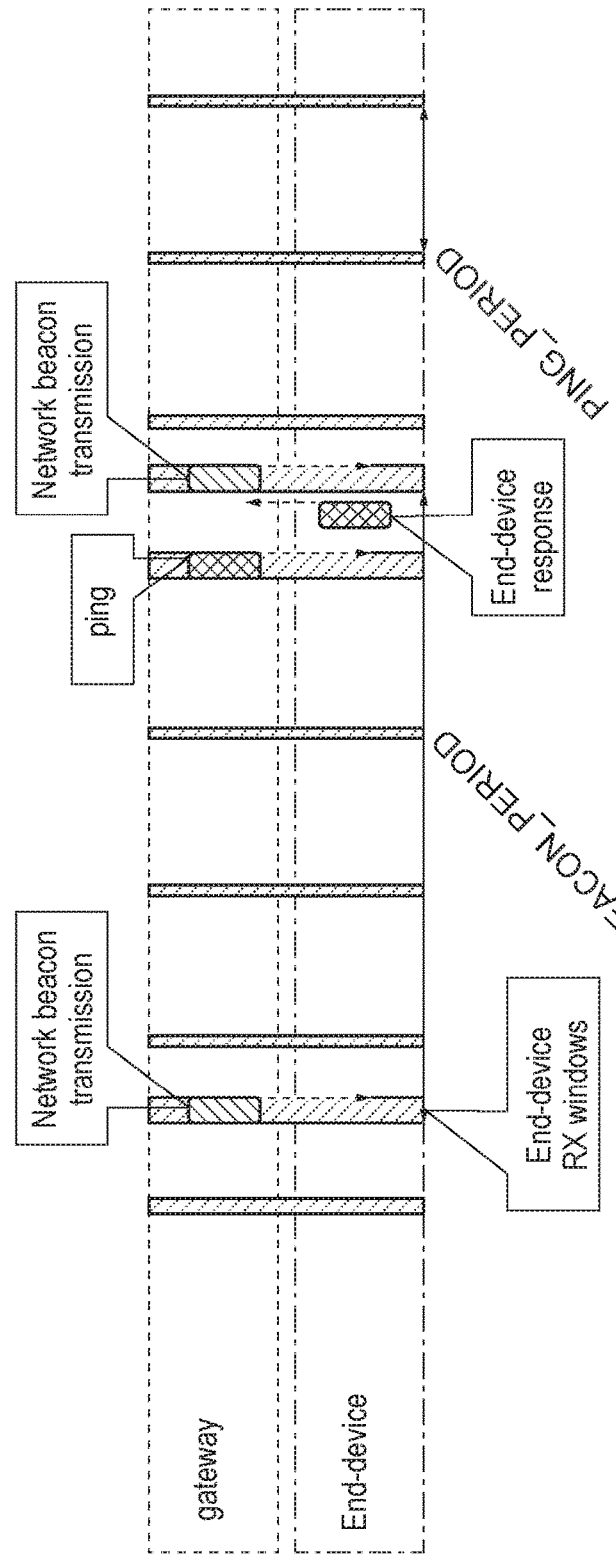
FIG. 4 depicts an example communication for a Class B device.
Figure 5:
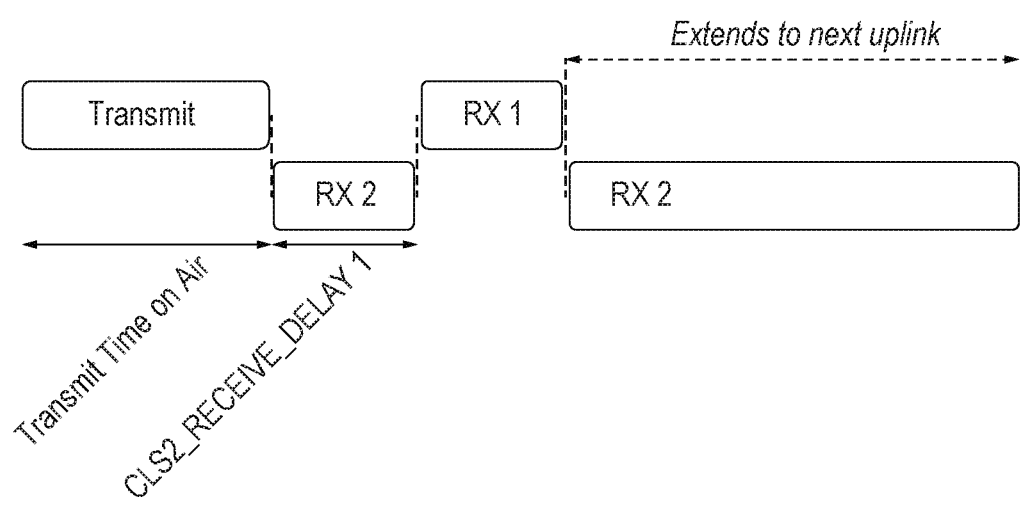
FIG. 5 depicts an example communication for a Class C device.

In some cases, LoRa and LoRaWAN are sufficient for defining the behavior of a private IoT network in which a single network server is used. These private networks are typically deployed by a single customer for a specific goal (e.g., smart metering). The end nodes in these networks are typically similar, for instance in terms of traffic they generate. In such networks, the network server may provide the control plane and user plane functionality to manage the fixed set of end nodes. In particular, for example, the network server may have access to end node activation information (e.g., AppEUI, DevEUI, AppKey) that is required to allow the end nodes to join the network. The network server may have access to end node configuration information such as, for example, a status (e.g., battery level) of an end device, transmit parameters, downlink channel frequency, duty cycle, or reception window parameters. Further, in a private IoT network, the network server may store and parse the data produced by the end nodes. The network server may store the data that is to be sent to end nodes, and schedule these transmissions during the end node receive windows. Further still, the network server, as shown in FIG. 1, may have an IP connection to each of the LoRa gateway (GW) nodes.

It is recognized herein that a mobile network operator might offer a public IoT network that serves multiple customers. Each of the customers may their have own set of end nodes. In some cases, each of these end nodes have different traffic requirements. Further, these public networks might be expected to serve a large number of end nodes. Thus, it is recognized herein that, in some cases, a single, "one size fits all" network server may make it difficult for the mobile network operator to provide differentiated services to each of its customers. By way of example, some customers may only want to host Class A devices. If these customers are sharing a network server with Class B devices, the available capacity will be reduced due to the beacon transmissions and the scheduled receive windows. The Class A customers may be better served by a dedicated network server, and LoRaWAN does not support distributing end nodes to different physical network servers. It is further recognized herein that, in the case of roaming end nodes, the network server in a visited operator network may need to communicate with the network server in a home operator network. No such inter-NS communication is defined in LoRaWAN. It is also recognized herein that, as the number of end nodes increase, the load on a particular network server increases, which may reduce its performance. In addition, the network server becomes a single point of failure for the entire network. Thus, if such a network server goes down, communication to/from the end nodes is no longer possible, and any end node context stored in the network server may be lost. It is recognized herein that no process is defined to have the network server load distributed across network servers.

It is further recognized herein that LoRaWAN networks are sensitive to channel load. LoRaWAN Class A devices typically use an Aloha-like access mechanism. Thus, as the load on the channel increases (for instance as a result of more end nodes joining the network), the probability of collision increases, and the performance degrades. In one example simulation, results show that about 82% of the packets are lost when the LoRaWAN network is fully utilized.

LoRa radio access technology uses a shared ISM band (868 MHz and 433 MHz in EU and 915 MHz in US). It is recognized herein that LoRa technologies can be sensitive to interference caused by neighboring LoRaWAN networks, or caused by other technologies using the same frequency bands.

It also recognized herein that while LoRaWAN provides some limited control plane functionality, this might not be enough to address the issues summarized above. As described herein, mobile operators can leverage their core network infrastructure to provide value added control plane functionality to the LoRaWAN network. Mechanisms to provide these new functionalities are described in detail below.

Figure 8:
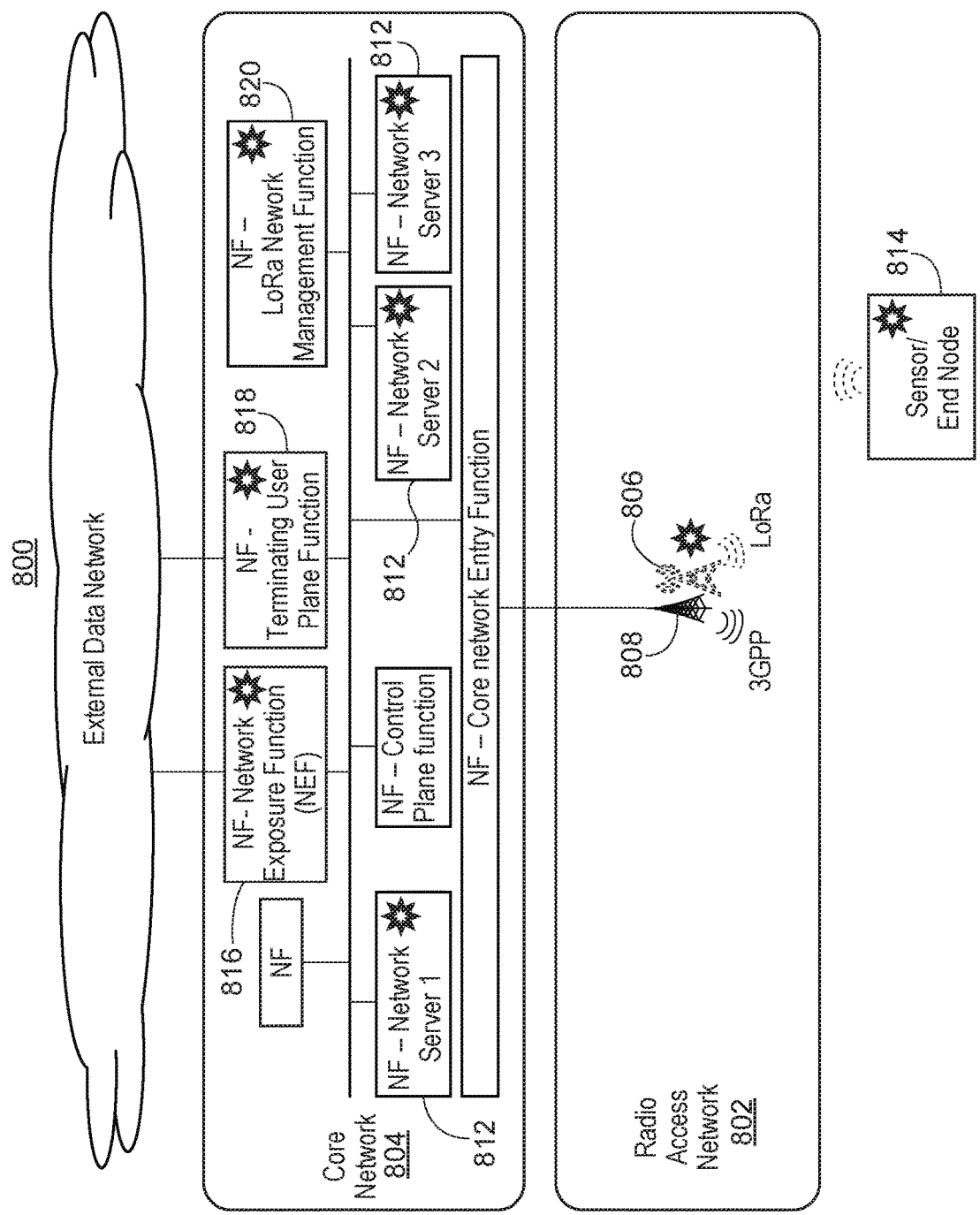
FIG. 8 is a block diagram of an example LPWAN network in accordance with an example embodiment.

Referring now to FIG. 8, an example system 800 is depicted. The example system 800 includes various nodes that may be impacted by embodiments described herein. For example, the system 800 includes a radio access network 802 that includes a LoRa gateway 806 alongside an existing 3GPP gateway 808. The radio access network 802, in particular the LoRa gateway 806, may communicate with one or more end nodes 814. The system 800 further includes a core network 804 that includes various network servers 812, a network exposure function (NEF) 816, a terminating user plane function 818, and a LoRa network management function 820. It will be appreciated that the example system 800 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 8, and all such embodiments are contemplated as within the scope of the present disclosure.

Referring generally to FIG. 8, a public LoRa network offered by a mobile operator may serve a very large number of end nodes 814, and may be deployed with multiple physical network servers, for instance network servers 812. These network servers 812 may allow the operator to offer differentiated services and LoRaWAN capabilities. For example, the network servers 812 may provide differentiated charging. By way of example, one network server 812 may provide charging records based on the number of end nodes 814 that have joined, while another network server 812 may provide charging records based on traffic to/from an end node 814, etc. In an example, the network servers 812 may provide different LoRaWAN capabilities. By way of further example, one network server 812 may be geared towards end nodes 814 that require some limited guaranteed QoS, and another network server 812 may be tailored to end nodes 814 that are UL only, etc. The network servers 812 may be tied to different end node classes. By way of example, one network server 812 may be reserved for Class A devices, and another network server 812 may be reserved for Class B devices.

In some cases, multiple network servers 812 may reduce the processing and storage burden caused by a large number of end nodes 814. This may allow each of these network servers 812 to manage a subset of the end nodes 814.

In the examples described below, it may be assumed, unless otherwise specified, that the core network 804 has subscription information for each of the end nodes 814, and that this information is stored in a suitable network entity, such as the unified data repository (UDR) and unified data management (UDM) network function, for example. Further, it will be understood that, unless otherwise specified, the functionality described below may be implemented in dedicated physical nodes, or as virtualized network functions.

Figure 9:
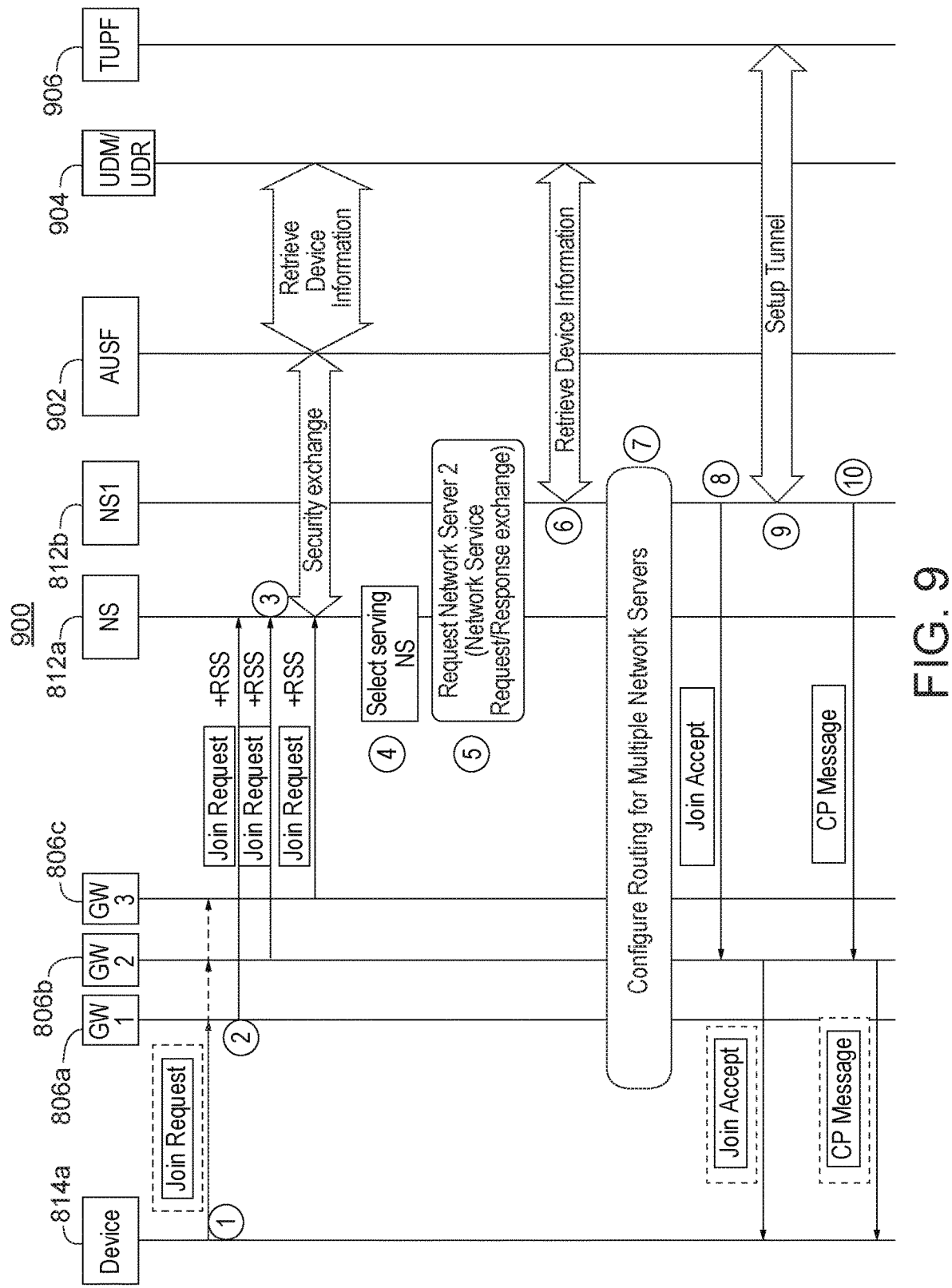
FIG. 9 is a call flow for a core network assisted join procedure in accordance with an example embodiment.

A core network assisted join procedure is now described, with reference to FIG. 9. The LoRaWAN Join procedure allows an end node to join a LoRa network and establish an association between the end node and the network server. As part of this association, security session keys are derived in the end node and network server, a DevAddr is assigned to the end node, and the network server is prepared to host context for the end node. This context includes gateway received signal strength information and downlink packets waiting to be sent.

In accordance with an example embodiment, a core network may assist the join procedure by providing the framework for the security exchanges, functionality to balance the load across network servers, a mechanism to determine if traffic from an end node is to use Non-IP Data Delivery (NIDD) or IP data delivery, and a mechanism to assign IP addresses to end nodes (if needed). An example system 900 is shown in FIG. 9, which includes a device or end node 814a, a first gateway 806a, a second gateway 806b, a third gateway 806c, a first or default network server (NS) 812a, a second NS 812b, an Authentication Server Function (AUSF) 902, a Unified Data Management (UDM) 904 or Unified Data Repository 904 (which may collectively be referred to as the UDM/UDR 904), and the terminating user plane function (TUPF) 906. The default server 812a may be preconfigured, for example, based on a physical proximity between a particular gateway 806 and the server 812. As used herein, unless otherwise specified, a default network server generally refers to a LPWAN network server that processes Join requests from end nodes. This server may be pre-configured. The gateways in a given LPWAN may have a default network server configured, where they send Join requests. It will be appreciated that the example system 900 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 9, and all such embodiments are contemplated as within the scope of the present disclosure.

Referring in particular to FIG. 9, in accordance with the illustrated example, the gateways 806a, 806b, and 806c are connected to the default network server 812a. At 1, the end node 814a issues a Join request and supplies its Application Extended Unique Identifier (AppEUI) and its Device Extended Unique Identifier (DevEUI). Additionally, the Join request may include a preferred network server type or indication. The Join request may be encapsulated in a LoRa modulated frame. At 2, the request is received by multiple gateways 806, for instance the first gateway 806a, the second gateway 806b, and the third gateway 806c. In accordance with the illustrated example, each of these gateways may forward the request to their default network server 812a, along with an indication of the received signal strength. Thus, a network server may receive a join request, via a gateway or a plurality of gateways, from an end node. The network server may further receive a received signal strength (RSS) indication from each of the plurality of gateways such that each gateway is associated with a respective RSS. The join request may include an indication of the network server that is preferred by the end node. The join request may include an indication of a class of the end node. The messages may be sent to the network servers via a Core Network Access and Mobility Management Function (AMF).

At 3, the default network server 812a may rely on the core network infrastructure to establish the security session keys. The network server 812a may start a security exchange with the Authentication Server Function (AUSF) 902, which may retrieve end node subscriber information from the UDM/UDR 904. A device address (DevAddr) may also be assigned to the end node 814a. At 4, the default network server 812a determines which network server will manage the end node 814a. The network server may be determined based on the end node. In the illustrated example, the determined network server depicted is the second network server 812b in FIG. 9, and this server may also be referred to herein as the managing network server. A managing network server generally refers to an LPWAN network server that has been selected by the network management function 820 to manage an end node and terminate the MAC connection for the end node.

The default network server 812a may base its selection on its local policies. The default network server 812a may also base its selection on a preferred network server that is indicated in the Join request. In addition, the default network server 812a may also try to balance the load across network servers, as further described herein.

At 5, in accordance with the illustrated example, the Join request, which was sent from the end node 814a, is forwarded to the managing network server 812b. As shown, security information is retrieved by the default NS 812a after 3. In an alternative example, the security information may be retrieved after 5 by the managing NS 812b. At 6, the LoRa network may be configured to route end node traffic to the managing network server 812b, which is described in further detail herein. At 7, the managing network server 812b may complete the Join procedure, and may retrieve necessary end node information from the subscription information, which may be retrieved from the UDM/UDR 904.

At 8, the managing network server 812b may select the best gateway 806 to reach the end node 814a. The gateway that is selected from the plurality of gateways to serve the end node may be selected based on the RSS indications. In accordance with the illustrated example, the managing network server 812b selects the second gateway 806b, and thus the second gateway 806b sends the Join accept message to the end node 814a during the end node's receive window. The network server 812b, therefore, sends the Join accept message, via the selected gateway 806b, to the end node 814a during a receive window of the end node 814a. The gateway 806b may encapsulate this message in a LoRa frame before transmitting on the downlink. In some cases, the managing network server 812b may obtain (e.g., from the UDM/UDR 904 or the default network server 812a) a list of gateways (or areas) that the device 814a is permitted (or expected) to connect to. At 9, the managing network server 812b sets up a tunnel with the terminating user plane function (TUPF) 818, which may be the last network function within the core network 804 that processes user plane data. The TUPF 818 may also assign an IP address to the end node 814a. At 10, the assigned IP address may be sent to the end node 814a in a new LoRa control plane (CP) message. For example, the message can be a new Control Plane message (such as LoRaDLMessage), which may include the assigned end node IP address and the address or identity of the managing network server 812b. In an example, a special port number may be reserved for LoRa control plane messages. Upon reception of the message, the end node 814a may extract the information.

In an alternative example, the default network server may be selected based on information stored in the subscription data (e.g., in the UDM/UDR 904). Upon reception of a Join request message, the gateway may determine the end node identity and query the UDM/UDR 904 to determine the default network server to use for the end node. The processing of the Join request may then continue at the default network server as described above with reference to step 4.

In another example, as an alternative to step 8 described above, no dedicated session is set up in the operator network for the joined end node 814a. Instead, for example, the traffic from the end node 814a may arrive at the managing network server 812b, and may be routed to the TUPF 818. Intermediate nodes may log the activity based on the end node DevAddr so that charging, flow control, etc. can be handled.

In yet another alternative example, rather than having the managing network server 812b retrieve end node information in step 6, this information may be retrieved by the default network server 812a at 3, and then the information may be forwarded to the managing network server 812b with the Join request.

Turning now to load balancing between network servers, it is recognized herein that, at least in some cases, load should be balanced across network servers. In an example, a managing network server is determined to manage a particular end node based on a load that is balanced across a plurality of network servers. This may be achieved proactively or reactively, through the assistance of the LoRa Network Management Function (LoRa NMF) 820. In an example, the LoRA NMF 820 is a centralized function that assists the LoRa network to manage the network servers 812. In an example proactive approach, the LoRa NMF 820 may determine the overall load to be assigned to each network server, and assign load targets (p) to each of these network servers. In an example, when an end node attempts to join the network, it contacts its default network server. Using the load target, the default network server may then randomly distribute the end node across the available network servers. For example, a given network server that has a load target of 0.50 may be assigned 50% of the joining end nodes. Thus, a given network server may receive a join request, via a gateway, from an end node. The network server may further receive load target information associated with each network server in the LPWAN, from a network management function. Based on the join request and the load target information, the network server may assign a network server to manage the end node. In some cases, the load target information is qualitative or associated with a numerical index.

In an alternative example, the default network server may additionally rely on end node profile information to better estimate the load incurred by the end node. Some nodes will generate/consume more data than others, and these may have a larger impact on the load resulting at a network server. In an example, the end node profile information may be an indication of the load resulting from an end node, which may include, for example, UL message size and frequency, DL message size and frequency, etc. By way of example, "Profile A" may define an end node that typically sends 100-150 bytes of UL messages once every 24 hours, and receives 10-20 bytes of DL messages every few hours. Continuing with the example, when assigning the end node to a network server, the default network server may retrieve the end node profile information from the subscription data in the UDM/UDR. Alternatively, or additionally, the end node profile information can be signaled by the end node in the Join request. The profile information can be stored in End Node Profile Information in the UDM/UDR, for example, as shown in Table 1 below.

not intended to limit the scope of this disclosure. Other devices, systems, and configurations may be used to implement the embodiments disclosed herein in addition to, or instead of, a system such as the system shown in FIG. 10, and all such embodiments are contemplated as within the scope of the present disclosure.

Figure 10:
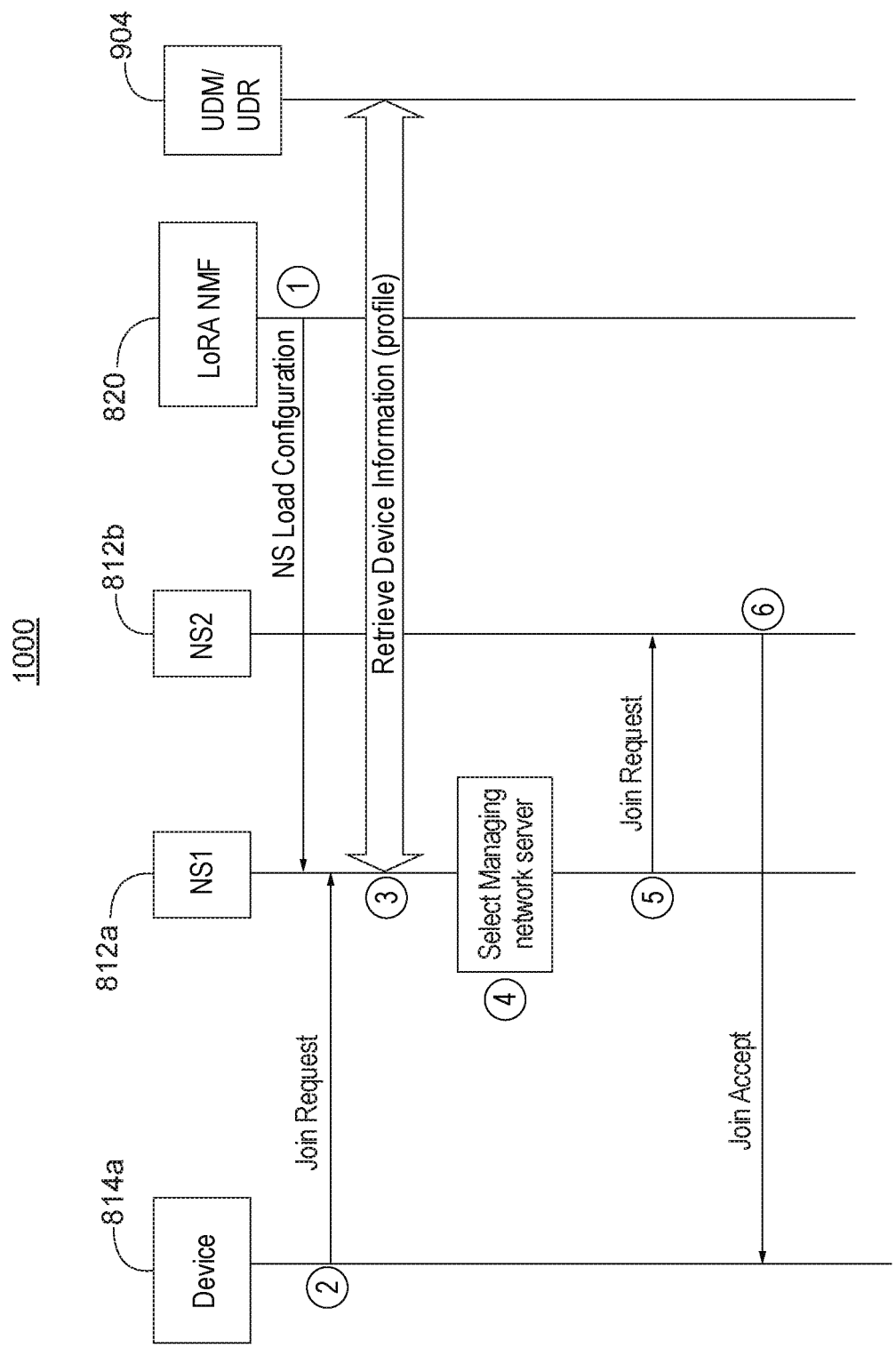
FIG. 10 is a call flow for selecting a managing network server in accordance with an example embodiment.

With reference to FIG. 10, in accordance with the illustrated example, at 1, the LoRa NMF 820 sends the server load target information to the, for instance all of the, network servers 812. This may sent via a NS Load Configuration message. The list may be updated periodically and/or when there is a change in the load targets. This list may include the network server identifier and the target load.

At 2, the end node 814a attempts to join the LoRa network. The end node transmits a Join request, which is forwarded by the gateways to their default network server 812a. At 3, in accordance with the illustrated example, the default network server 812a retrieves the end node profile information from the UDM/UDR 904. It may use the AppEUI and/or DevEUI to identify the end node. The information returned may include a profile indication. For example, the indication may be a qualitative measure (e.g., high, medium, low) or a numeric index in which each index maps to a level of activity for the end node 814a. By way of example, the index may be from 1 to 9, where 1 indicates a communication frequency of once over 3 days and 9 indicates a communication frequency of once every 2 hours. It will be understood that the indices may be defined as desired.

Still referring to FIG. 10, at 4, in accordance with the illustrated embodiment, the default network server 812a uses the load targets and end node profile to assign the end node 814a to a network server, for instance the NS 812b. For example, the default network server 812a may know that end nodes with "Profile A" should be assigned to one of a group of network servers. The choice between the network servers in the group can be based on a target load, for example. At 5, the default network server forwards the Join request to the selected network server (NS 812b), which then proceeds with the Join procedure as described above. At 6, the managing network server 812b may respond to the end node 814a with a Join Accept message.

In addition to the reactive approach, in some cases, the LoRa NMF may need to proactively manage an overload

TABLE 1

Example End Node Profile Information

| End Node devAddr | Min UL Message Size | Max UL Message Size | UL Message Frequency | Min DL Message Size | Max DL Message Size | DL Message Frequency |
|---|---|---|---|---|---|---|
| Address1 | 100 | 150 | Every 24 hrs | 50 | 55 | Every 24 hrs |
| Address2 | 10 | 20 | Every 2 hrs | 15 | 20 | Every 2 hrs |
| Address3 | 39 | 35 | Every week | — | — | — |

A call flow for an example reactive approach in an example system 1000 is shown in FIG. 10. The example system 1000 includes the device or end node 814a, the first or default network server (NS) 812a, the second NS 812b, the LoRA NMF 820, and the UDM/UDR 904. In the example, the LoRa NMF 820 has the network server load targets (p), and the end node 814a has its subscription information stored in the core network (e.g., at an HSS or UDR), available through a network function. It will be appreciated that the example system 1000 is simplified to facilitate description of the disclosed subject matter and is condition at a network server. Network servers may regularly report metrics to the LoRa NMF 820. Alternatively, the network servers might only send out the report metric when an overload is detected. The content of the report metric may include various information, such as, for example, the number of end nodes that the network server is managing, the number of outstanding downlink packets queued and waiting to be sent (e.g., total for the entire network server or per end node), the number of DL retransmissions waiting to be sent (e.g., total for the entire network server or per end node), the maximum number of simultaneous packets (UL and DL) the NS has outstanding, or the like. The LoRa NMF 820 may use the reported metric to resolve the congestion. For example, the LoRa NMF 820 may transfer certain end nodes from one network server to another. The LoRa NMF 820 may ask certain end nodes to disconnect. In addition, or alternatively, the LoRA NMF 820 may ask the network server to remove queued packets that are waiting DL transmission, and it may additionally inform the external application, which sent the deleted packet, that the packet has been deleted.

In another example, the managing network server may use the received signal strength to determine the best GWs to serve the end node. The preferred number of GWs may be included as part of the end node subscription. By way of example, the preferred number may be set to K, indicating that the end node would like the best K GWs to forward the received MAC message to the network server. By way of another example, K may be set to 'all' to indicate that all gateways receiving the PHY frame should forward the MAC message. Upon receiving a Join request message, the managing network server may determine the serving GW(s). The managing server may indicate to these gateways the address of the end node they are to serve. Upon receiving an uplink frame, the gateway may cross-reference the frame to determine if it should forward the enclosed MAC message. If yes, the enclosed MAC message is forwarded. Otherwise the enclosed MAC message may be disregarded.

In an alternative example, instead of informing the GWs of the address of the end node, the network server may indicate to the end node the identities of its serving GWs. Any uplink frame may then include the list of uplink gateways. Upon receiving this frame, a gateway may verify that it is on this list before forwarding the MAC message to the network server.

Once the managing network server has been assigned to an end node, the LoRa network may configure the routing for the end node, for example, so that the uplink traffic arrives at the correct network server. This may be achieved by updating the gateways so that they know to route uplink traffic from the end node to the managing network server (and not the default network server). Alternatively, the routing function may be configured at the default network server. In this alternative example, the gateway traffic may continue to flow to the default network server, but the default network server would have to route the traffic to the correct managing network server.

Figure 11:
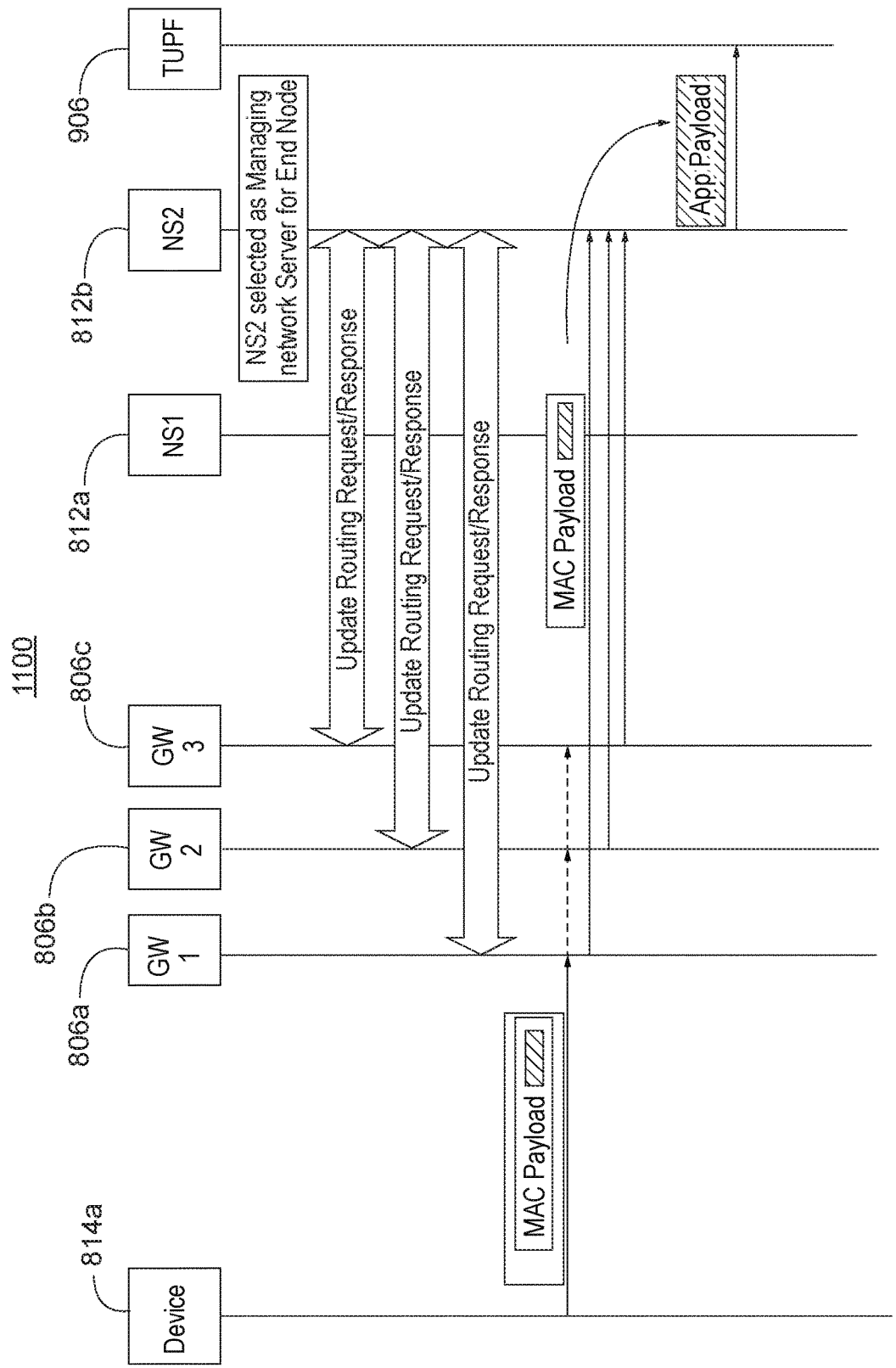
FIG. 11 is a call flow for routing by gateways in accordance with an example embodiment.

FIG. 11 depicts an example system 1100 in which the LoRa network configures the routing for the end node 814a. In accordance with the illustrated example, after the managing network server 812b accepts a Join request, it notifies the gateways 806a, 806b, and 806c that future uplink transmissions from the end node 814a with the specified DevAddr should be routed to the managing network server 812b. This may be accomplished through an Update Routing Request/Response exchange between the managing network server 812b and the gateways 812. The request message may include the DevAddr and the managing network server address or identity. Subsequently, when a gateway receives an uplink message, it first determines if this is a Join request or a MAC message. If the gateway determines that the uplink message is a Join request, the gateway forwards the request to the default network server 812b. If the gateway determines that the uplink message is a MAC message, the gateway may need to look inside the MAC header to determine the DevAddr. The gateway may then refer to its routing table to determine the managing network server 812b.

Figure 12:
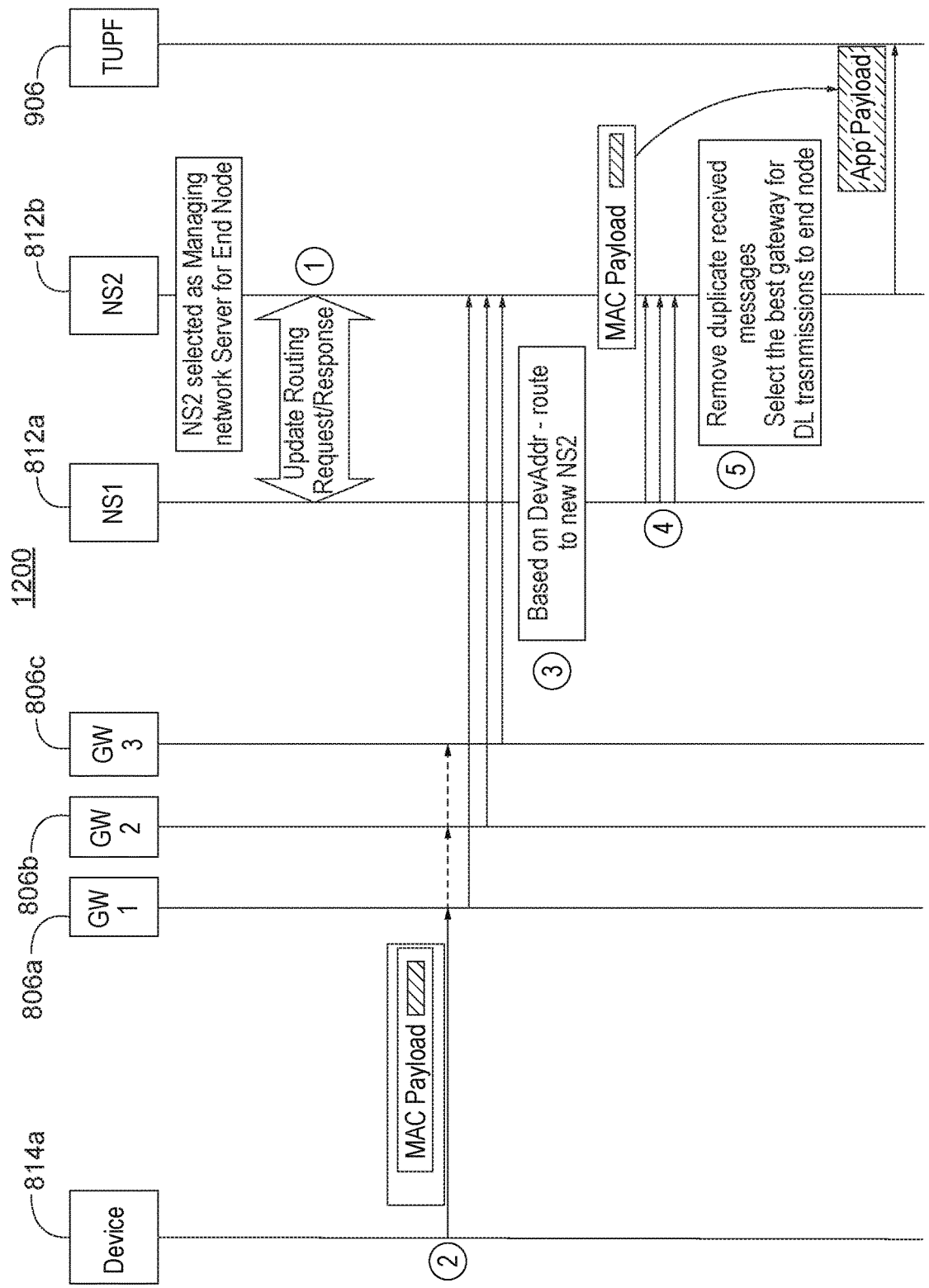
FIG. 12 is a call flow for routing by a default network server in accordance with an example embodiment.

FIG. 12 depicts an example system 1200 in which the routing functionality is included in the default network server. The example system 1200 includes the device or end node 814a, the first GW 806a, the second GW 806b, and the third GW 806c, a first or default network server (NS) 812a, the second NS 812b, and the TUPF 818. In the example, the NS 812b has been selected as the managing network server. It will be appreciated that the example system 1200 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 12, and all such embodiments are contemplated as within the scope of the present disclosure.

Referring to FIG. 12, at 1, in accordance with the illustrated example, after accepting the Join request from the end node 814a, the managing network server 812b informs the default network server 812a that transmissions from DevAddr should be forwarded to the managing network server 812b. This may be accomplished through an Update Routing Request/Response exchange. At 2, subsequent to 1, the uplink traffic from the end node 814a is forwarded by the receiving gateways (e.g., gateways 806a, 806b, and 806c) to the default network server 812a. At 3, the default network server 812a may first look to see whether it is the managing network server for this end node. If it is, the default network server 812a processes the received message. If the default network server 812a is not the managing network server for the end node 914a, at 4, the default network server 812a forwards the received messages to the correct managing server (server 812b) for this end node 814a. In an example, the network server may receive a transmission from a given end node, and may determine whether the end node has joined the LPWAN. If the end node has joined the LPWAN, the network server may forward the transmission from the end node to the managing network server. If the end node has not joined the LPWAN, the network server may process the transmission. At 5, the managing network server 812b may eliminate the duplicate messages, and determine the gateway that is to handle DL transmissions for this end node 814a.

In another example, as an alternative to steps 4 and 5, the default network server 812a may be responsible for removing duplicate (redundant) received packets and for determining the gateway to use for any DL transmission to the end node 814a. The default network server 812a may then forward a message to the managing network server 812b to signal the gateway to use for DL transmissions.

Figure 13:
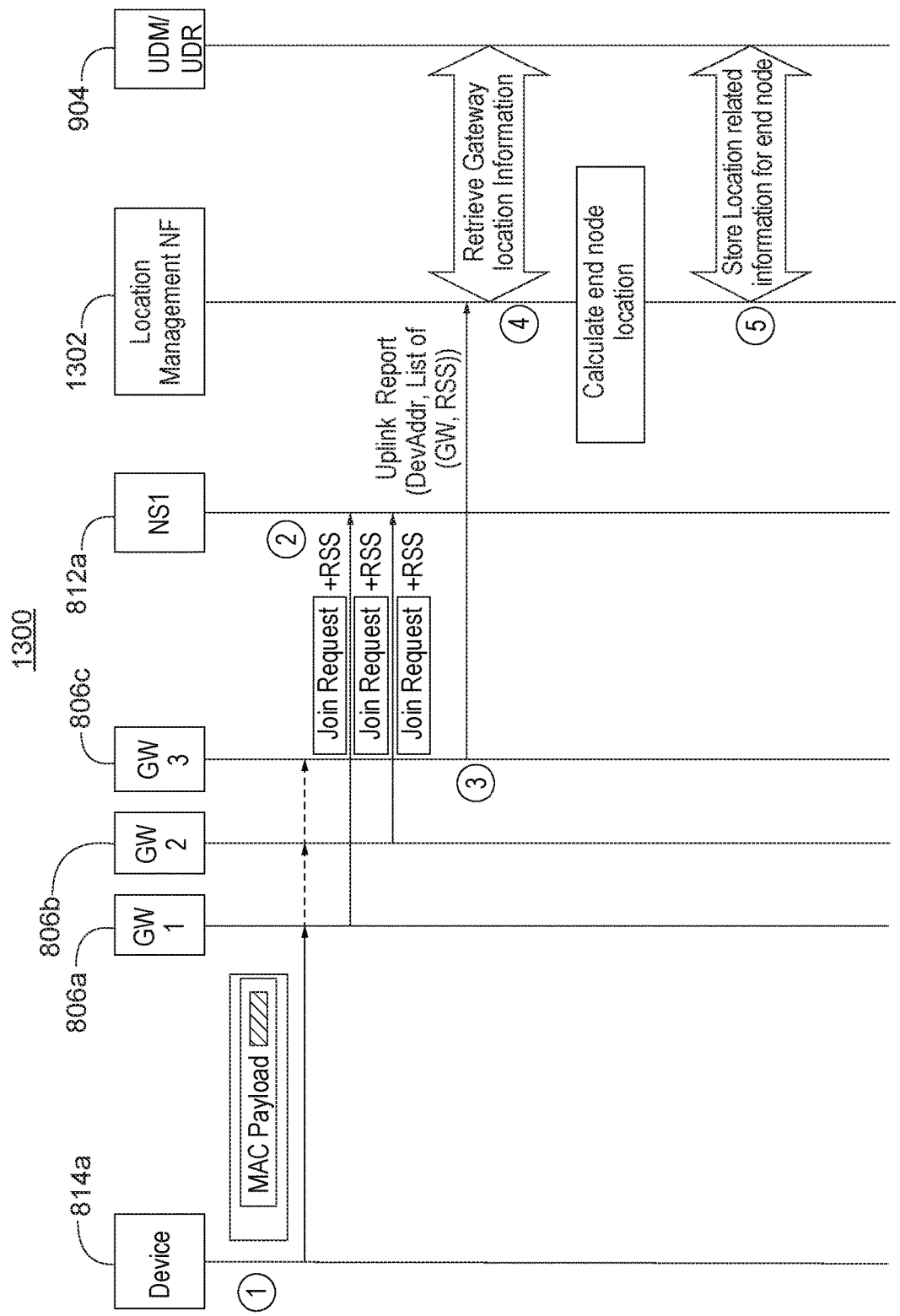
FIG. 13 is a call flow for location determination in accordance with an example embodiment.

Turning now to location management, it is recognized herein that mobile networks track the location of UEs, and therefore the mobile networks may be suited for determining locations, storing location information, and providing location information to third parties. FIG. 13 depicts an example system 1300 in which location information is managed. The example system 1300 includes the device or end node 814a, the first GW 806a, the second GW 806b, and the third GW 806c, a first or default network server (NS) 812a, a location management network function (NF) 1302, and the UDM/UDR 904. In the example, the gateway locations are known or can be retrieved from the location management network function 1302, which calculates the location of the end node 814a. It will be appreciated that the example system 1300 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 13, and all such embodiments are contemplated as within the scope of the present disclosure.

Referring to FIG. 13, at 1, in accordance with the illustrated example, for each uplink transmission, a set of gateways may receive the associated uplink message. At 2, the gateways may extract the payload from the LoRa frame, and forward it to the managing or default network server, along with a measure of the received signal strength. At 3, based on configuration information that was retrieved from the UDM/UDR 904, the network server 812a determines that the location of the device 814a should be tracked. The network server 812a also obtains the identity of the Location Management NF 1302 from the UDM/UDR 904. The network server 812a may send an uplink report to the NF 1302, which may include the DevAddr, the identity of the receiving gateways, and for each message, the received signal strength (RSS). The uplink report may be sent to the location management network function 1302. For example, the uplink report may be sent to the location management network function 1302 based on a join request. At 4, the NF 1302 may retrieve the location information for the receiving gateways from the UDM/UDR 904, and may use triangulation to estimate the location of the end node 814a based on the RSS value. Thus, location information associated with the end node can be determined from the uplink report. At 5, the determined location information and the information in the uplink report may be stored in the core network. The NF 1302 may also add a timestamp to the location information. In an example, the Location Management NF 1302 may allow other network functions to subscribe to the location information associated with a particular service, and may forward updated location information to the subscribing network functions.

Figure 15:
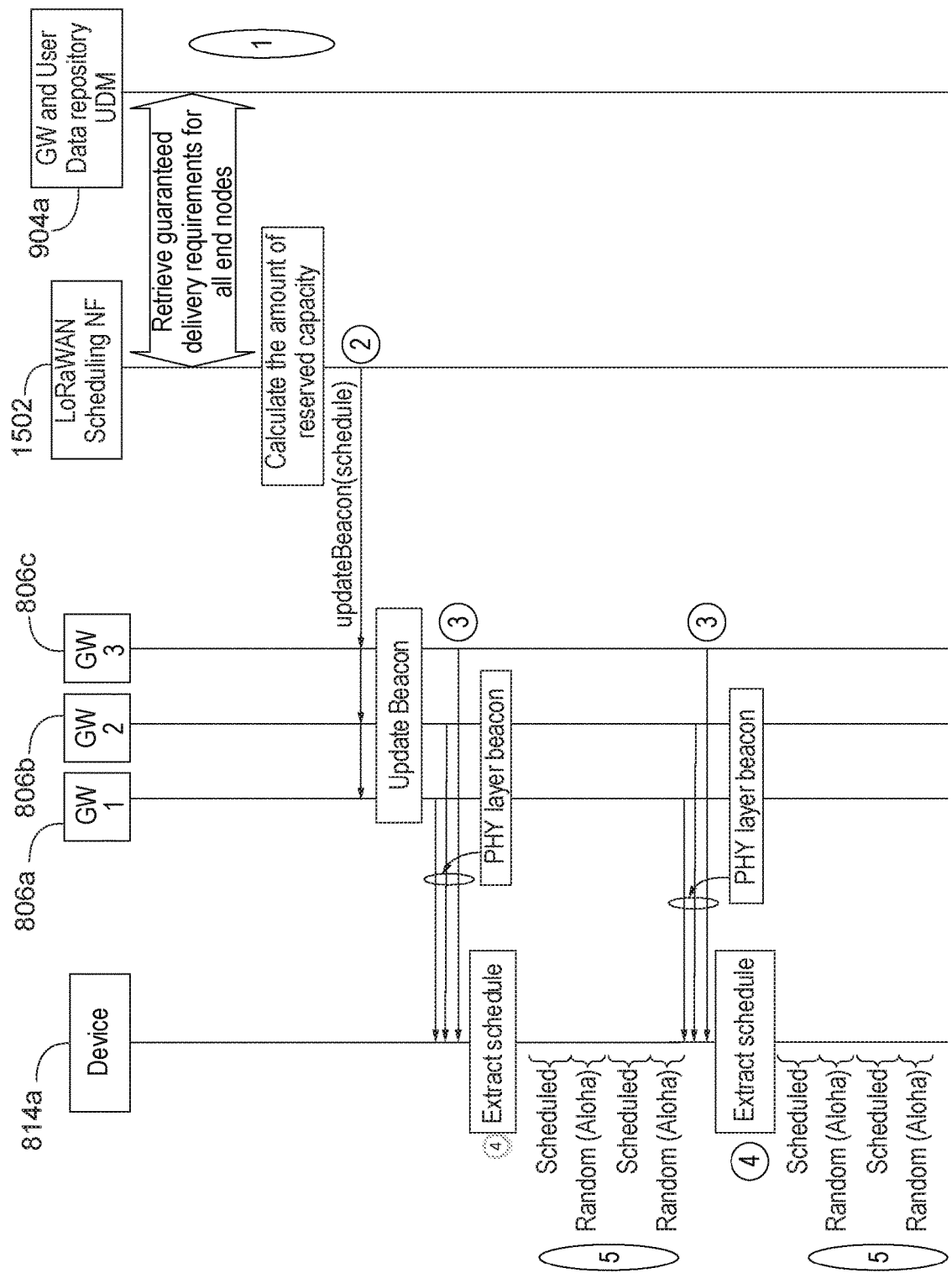
FIG. 15 is a call flow for configuring scheduled transmission periods in accordance with an example embodiment.

Turning now to example user plane enhancements, LoRaWAN networks typically rely on an Aloha-like access control mechanism for both uplink and downlink transmissions. This mechanism may be efficient for low and non-interfering loads, but, as recognized herein, may result in a significant number of collisions and retransmissions as the load increases. Some simulation results suggest that the maximum channel utilization of LoRaWAN may be very close to that of Aloha (e.g., 18%). It is recognized herein that this may make the scheme inappropriate, for example, for end nodes that require some form of guaranteed quality of service, such as for example an end node that signals a fire alarm or other emergency situation. Thus, it is further recognized herein that the core network, at least because it has visibility and control over the entire network, may be well suited to provide a form of scheduled uplink. FIG. 15 depicts an example of a scheduled uplink in a LoRA network.

Referring to FIG. 15, an example system 1500 is depicted that includes the device or end node 814a, the first GW 806a, the second GW 806b, and the third GW 806c, a LoRaWAN scheduling network function (NF) 1502, and a GW and user data repository UDR/UDM 904a. It will be appreciated that the example system 1500 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 15, and all such embodiments are contemplated as within the scope of the present disclosure.

Figure 14:
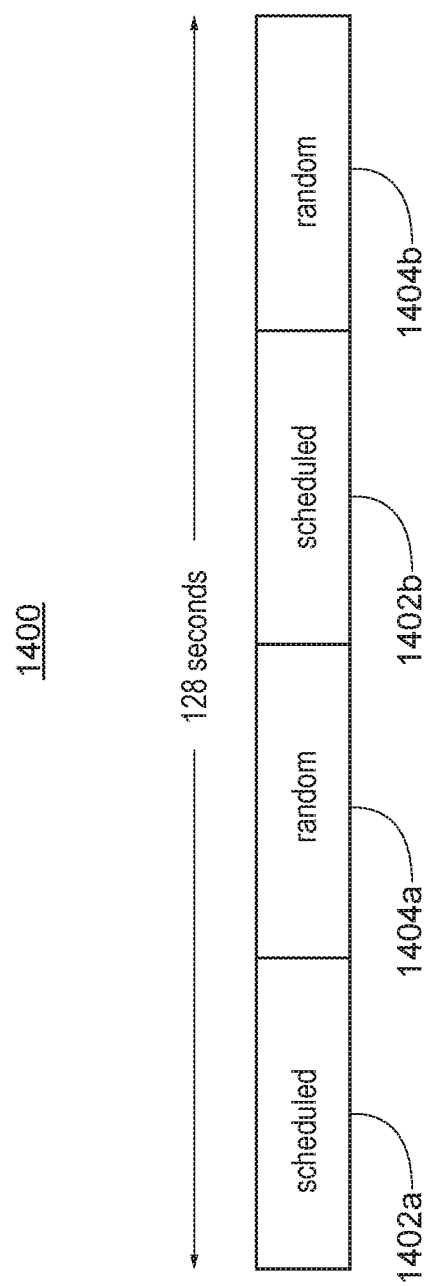
FIG. 14 depicts an example scheduled transmission period in accordance with an example.

In accordance with the illustrated example, at 1, the LoRaWAN Scheduling network function 1502 can determine the amount of scheduled capacity that is required based on the needs of the end nodes. By way of example, the network function 1502 may determine that 50% of the capacity needs to be set aside for scheduled transmissions. A number of events may trigger the LoRaWAN network function 1502 to evaluate the scheduling. For example, the evaluation may be done periodically, upon request by a third party application, and/or when a certain end node or group of end nodes has joined the network. The LoRaWAN Scheduling network function 1502 may obtain end node traffic information to assist in determining the schedule, as needed. At 2, in accordance with the illustrated example, the LoRaWAN scheduling network function 1502 provides a schedule to the gateways so that the gateways may update their beacons. By way of example, the schedule may indicate that every 32 seconds the channel changes from scheduled to random (e.g., Aloha) transmissions. In accordance with the example, referring to FIG. 14, this allows two scheduled transmission periods (e.g., a first scheduled transmission period 1402a and a second scheduled transmission period 1402b) in every 128 second beacon interval 1400. The example beacon interval 1400 may also include two random transmission periods, for instance a first random transmission period 1404a and a second random transmission period 1404b.

Still referring to FIG. 15, at 3, in accordance with illustrated embodiment, the gateways 806 send the schedule information as part of each beacon. At 4, the ends nodes, for example the end node 814a, extract the schedule. At 5, in accordance with an example, the end nodes transmit during the scheduled periods 1402 without using random (e.g., Aloha) access. Further, the end nodes may transmit without collision during the scheduled periods 1402. During the scheduled transmission periods 1402, uplink access may be based on a strict time division. For example, end nodes may be given specific periods when they can transmit and this period may repeat. In an alternative example, end nodes may be polled by the network server. The server may use the already defined receive windows to obtain a poll message. An end node (user) may have sole access to the uplink after the end node is polled.

Turning now to LoRaWAN network exposure, the network exposure function 816 may allow third party applications to take advantage of the control plane enhancements to LoRaWAN networks described herein, which are enabled by the mobile core network. For example, the network exposure function 816 may allow a third party application to more efficiently send downlink traffic to end nodes, by requesting end node LoRaWAN operating parameters. The network exposure function 816 may allow third party applications to make a request for scheduled or guaranteed transmission to/from an end node. For example, the network may use the guaranteed delivery mechanism to configure the scheduled LoRaWAN transmissions. Further, the network exposure function 816 may allow a third party application to request that an end node update its location. This may be especially useful for end nodes that are dormant for significant periods of time. For these end nodes, the network cannot have up-to-date location information using current approaches.

With respect to an example location request, in some cases, uplink transmissions from an end node may be very infrequent. For these end nodes, the location information stored in the core network may be stale. In an example embodiment, an application can trigger the end node to update its location information. This mechanism may be accessed through the network exposure function 816 of the core network. Referring to FIG. 16, an example system 1600 is depicted that illustrates an example of a location request. As shown, the example system 1600 includes the device or end node 814a, the first GW 806a, the second GW 806b, the third GW 806c, the first or default network server 812a, the location management network function 1302, the GW and user data repository UDR/UDM 904a, the network exposure function 816, and a third party application 1602. In the illustrated example, the application 1602 wishes to find the location of the end node 814a. The application 1602 knows the IP address or identity of the end node 814a. Further, prior to performing step 1, the third party application 1602 may know that the current location of the end node 814a is unavailable or outdated. It will be appreciated that the example system 1600 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 16, and all such embodiments are contemplated as within the scope of the present disclosure.

Figure 16A:
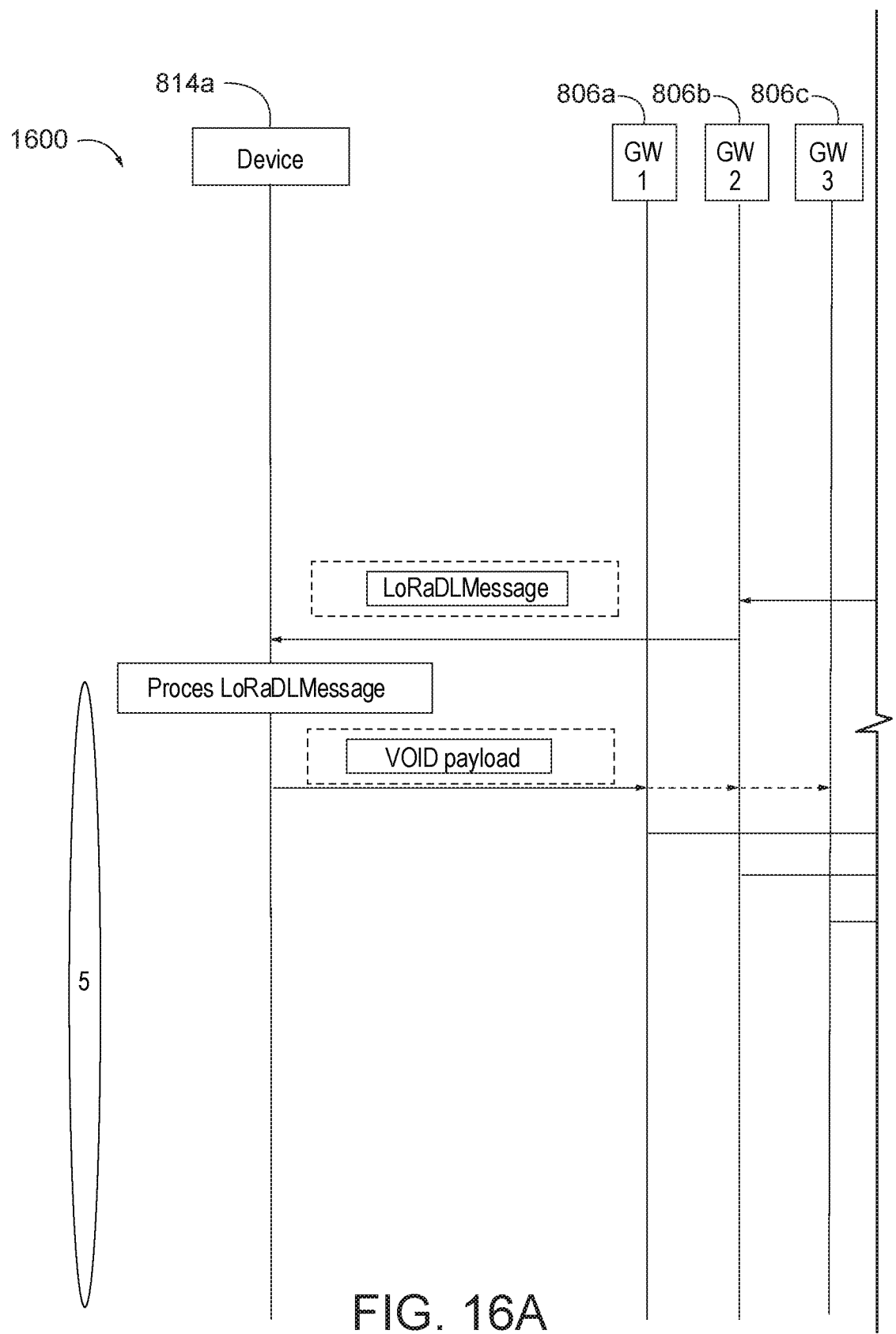
FIGS. 16A-D, is a call flow for a third party application to request a location update in accordance with an example embodiment.
Figure 16B:
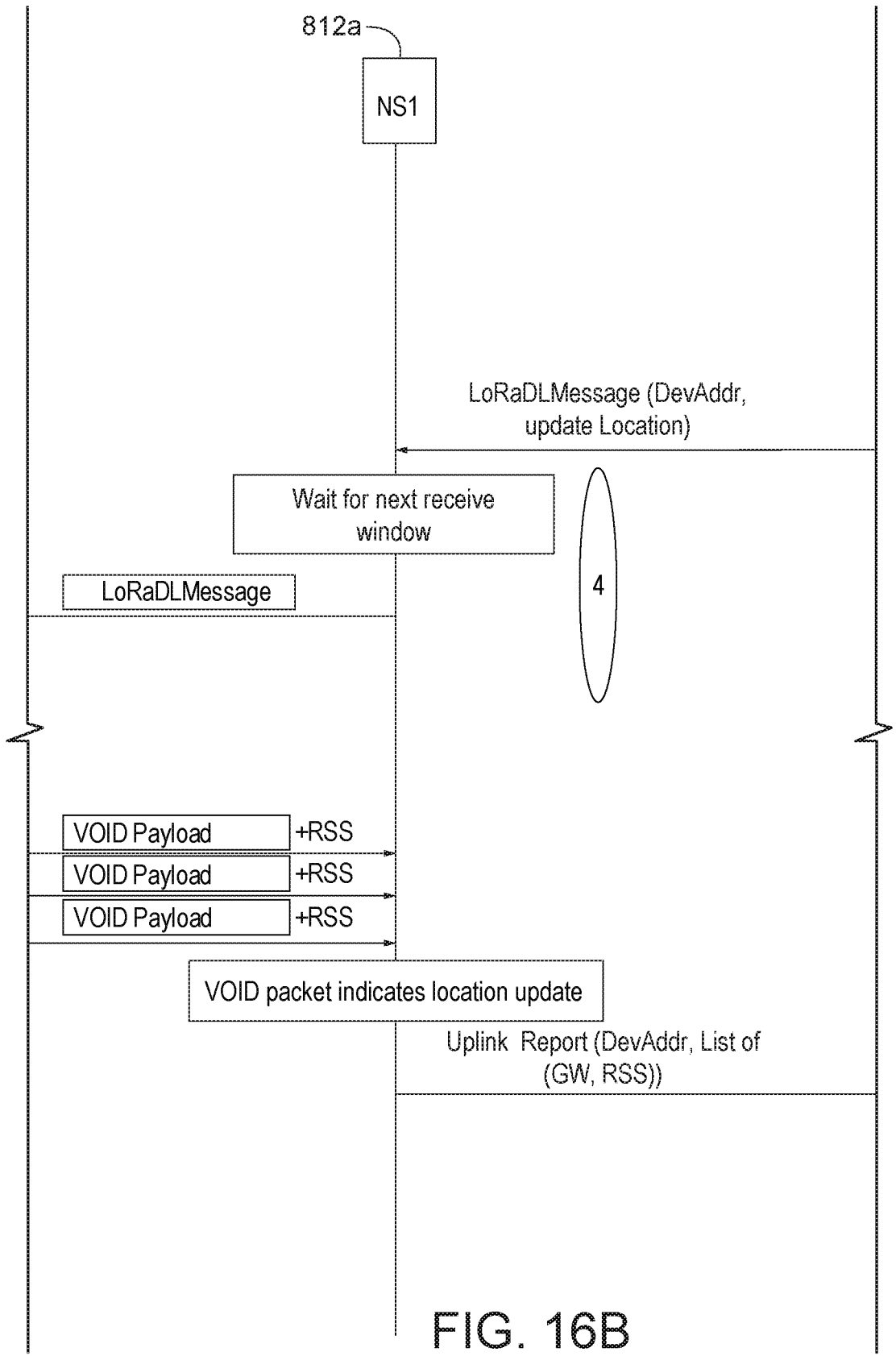
Figure 16C:
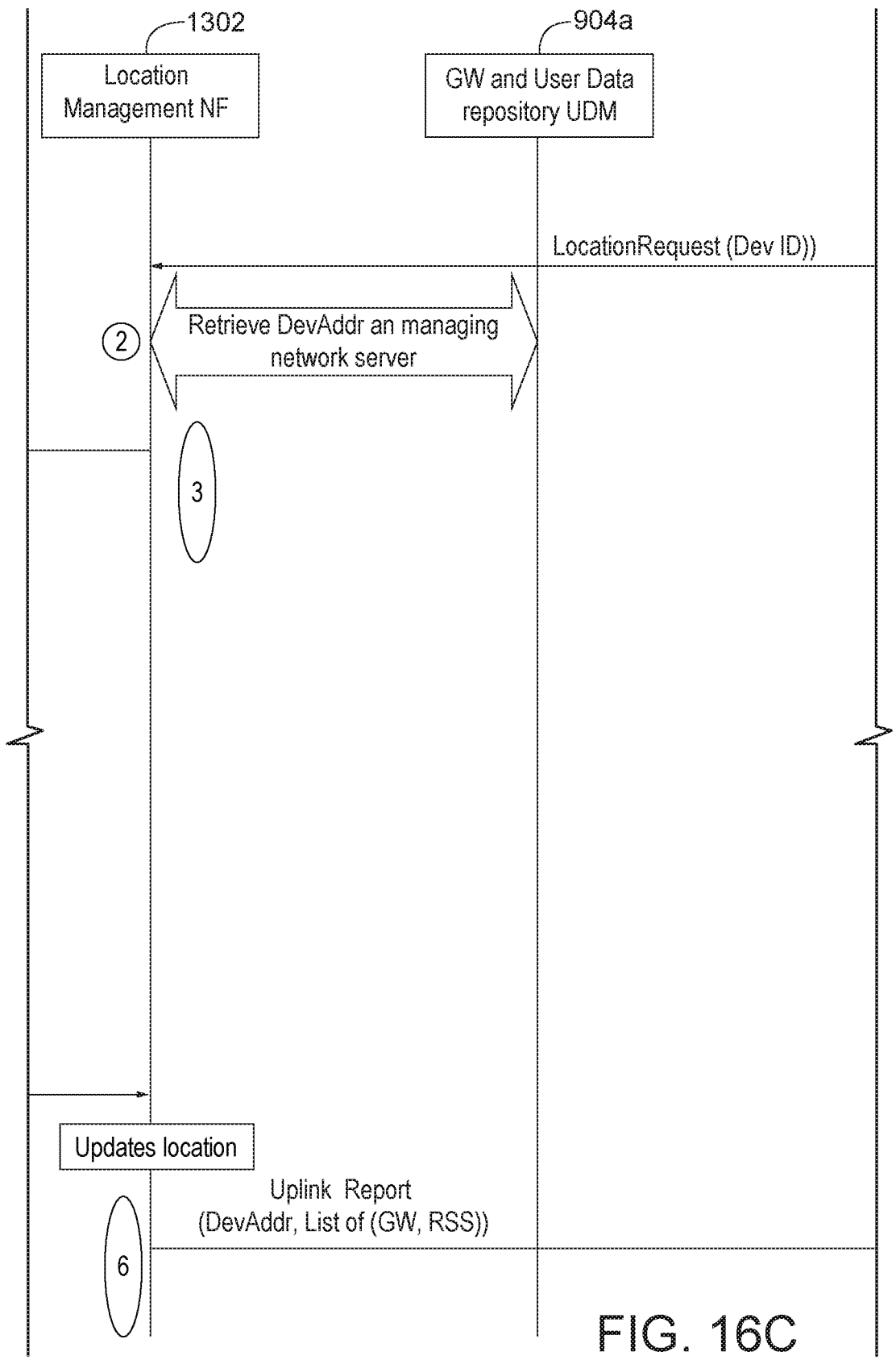
Figure 16D:
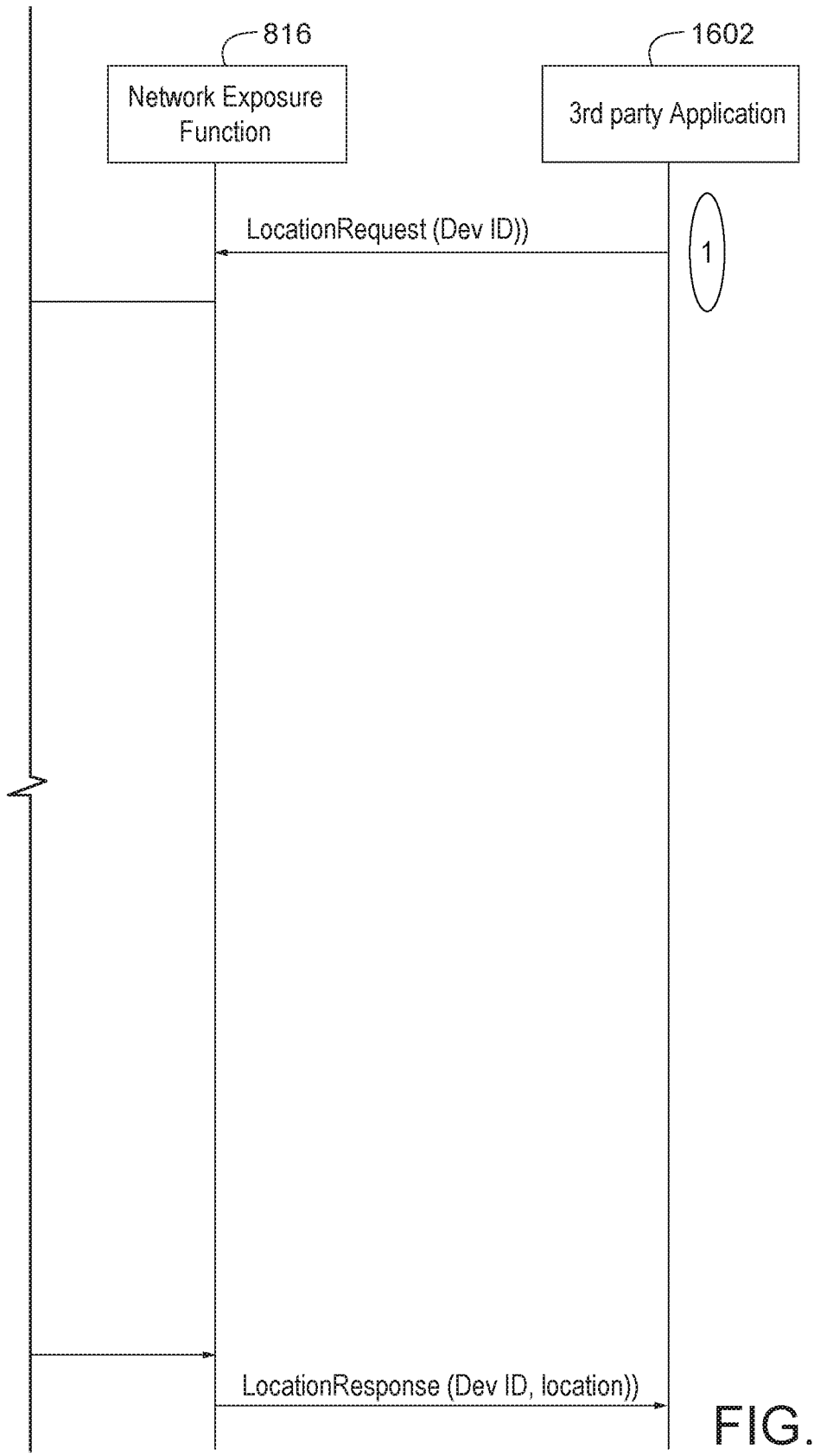

Referring to FIG. 16, in particular FIGS. 16C-D, at 1, in accordance with the illustrated example, the application 1602 sends a location request to the core network. The location request may specify a device identity. The device identity may be the IP address of the end node 814a, its DevAddr, its DevEUI, or some other identity. The message is forwarded to the location management network function 1302 from the network exposure function 816. At 2, the location management network function 1302 uses the supplied identity (e.g., IP address, DevEUI) to retrieve the end node's DevAddr and managing network server (e.g., NS 812a). At 3, the location management network function 1302 sends a LoRaDLMessage to the managing network server 812a. The message may include the DevAddr of the end node 814a, and a cause value set to "updateLocation." At 4, the managing network server 812a may wait for the next available receive window for the end node 814a to transmit the LoRaDLMessage. In an example, the end node 812a is a Class B device that has regularly scheduled receive windows. At 5, the end node may interpret the DL message, and send a VOID packet on the uplink. This packet may trigger the LoRaWAN network to update the end node's location. For example, the end node may send a LoRa frame with a PHY payload that is integrity protected (e.g., signed) but only contains a MAC header field. The end node 814a may use some of the "reserved for future use" bits in the header, to signal the VOID packet. At 6, in accordance with the illustrated example, the location management network function 1302 responds to the location request from step 1 with a current estimate of the end node's location.

In an alternative example, the third party application 1602 may issue a location request, and the request may specify how old a location estimate that the application 1602 is willing to tolerate. For example, the application 1602 may ask to retrieve a location estimate that has been evaluated at least within the last 60 minutes. Upon receiving the request, the Location Management NF 1302 may determine if there is a fresh (taken within the last hour) location estimate for the end node 814a. If there is, the NF 1302 may return a LocationResponse immediately to the third party application 1602. Otherwise, it may proceed with step 3 of FIG. 16.

Figure 17:
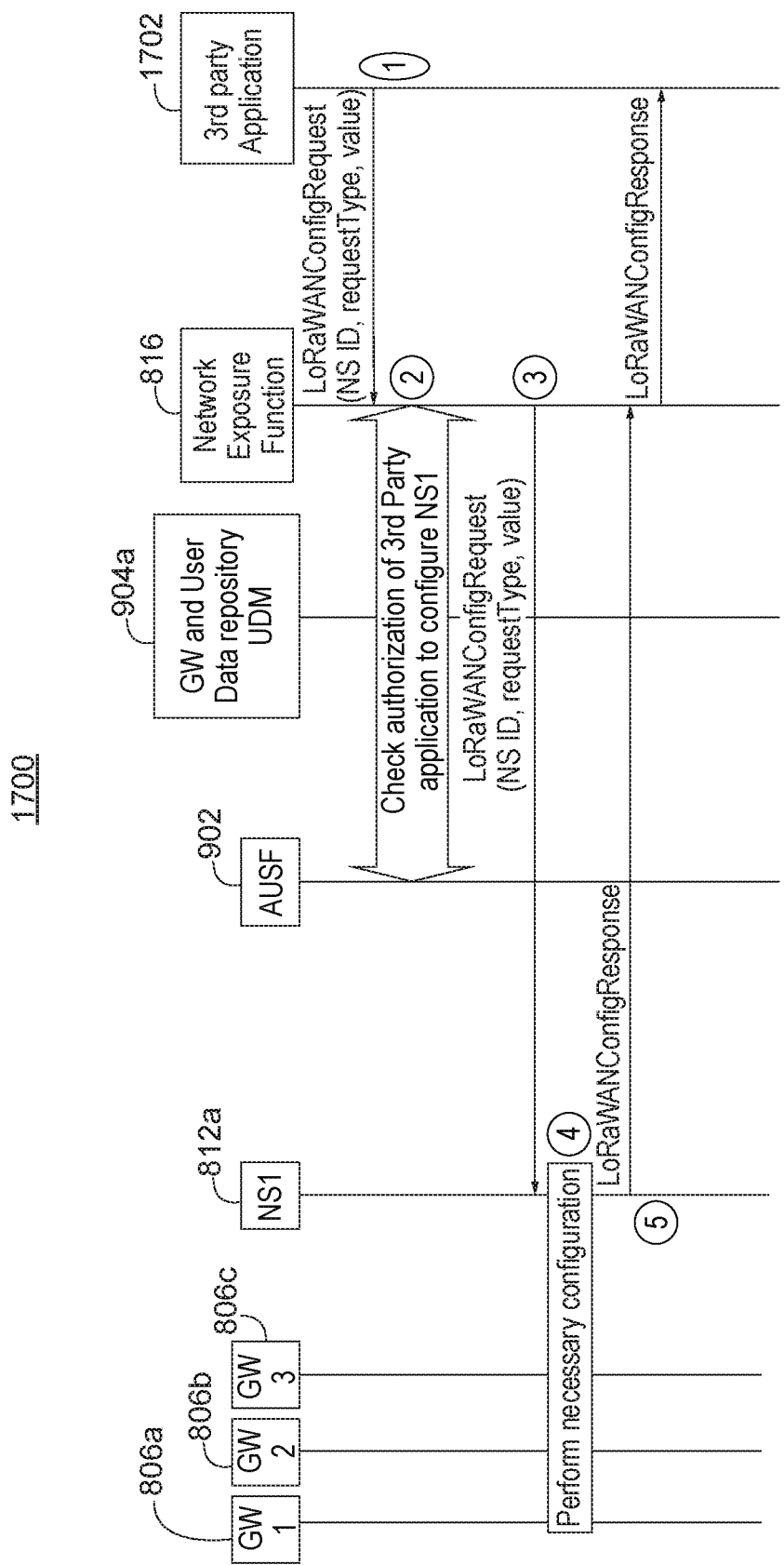
FIG. 17 is a call flow for a third party application to use a network exposure function to configure a LoRaWAN in accordance with an example embodiment.

Referring now to FIG. 17, the 3GPP operator network allows third party applications to configure LoRaWAN network operating parameters, and to view statuses concerning the LoRaWAN network and the end nodes. FIG. 17 depicts an example system 1700 in which a third party application 1702 uses the network exposure function 816 to configure a LoRaWAN network. It will be appreciated that the example system 1700 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 17, and all such embodiments are contemplated as within the scope of the present disclosure.

At 1, in accordance with the illustrated example, the third party application 1702 issues a configuration request (e.g., LoRaWANConfigRequest) to the network exposure function (NEF) 816. The command may include an identity of the targeted network server(s) 812, a request type, and an associated parameter for the request type. Example request types include, presented by way of example without limitation:

SetDutyCycle: set the maximum aggregated transmit duty cycle of end nodes that have joined this network server SetReceiveWindowParam: Sets the frequency and the data rate set for the second receive window following each uplink transmission SetBeaconFequency: Set the frequency used for beacon transmission SetBeaconconfiguration: Set the receive slot configuration SetScheduledTransmission: set the schedule transmission period Thus, an apparatus comprising the NEF 816 may receive a configuration request from a third party application, and the configuration request may indicate at least one of a targeted network server of a low power wide area network (LP-WAN), a request type, and a parameter associated with the request type. The request type may include, for example, a request to set the maximum aggregated transmit duty cycle of end nodes that have joined the network server, a request to set a frequency and a data rate for a receive window following each uplink transmission, a request to set a frequency used for beacon transmission, a request to set a receive slot configuration, or a request to set a scheduled transmission period.

Still referring to FIG. 17, at 2, in accordance with the illustrated example, the NEF 816 verifies that the third party application 1702 is allowed to configure the targeted network server(s) 812. If allowed, at 3, the NEF 816 implements the configuration request. The NEF 816 may forward the configuration request to the network server(s) 812. At 4, the network servers, for instance the network server 812a, implements the requested configuration. The network server 812a may need to coordinate with the gateways 806. At 5, the network server 812a responds to the configuration request with a configuration response (e.g., LoRaWANConfigResponse).

Figure 18:
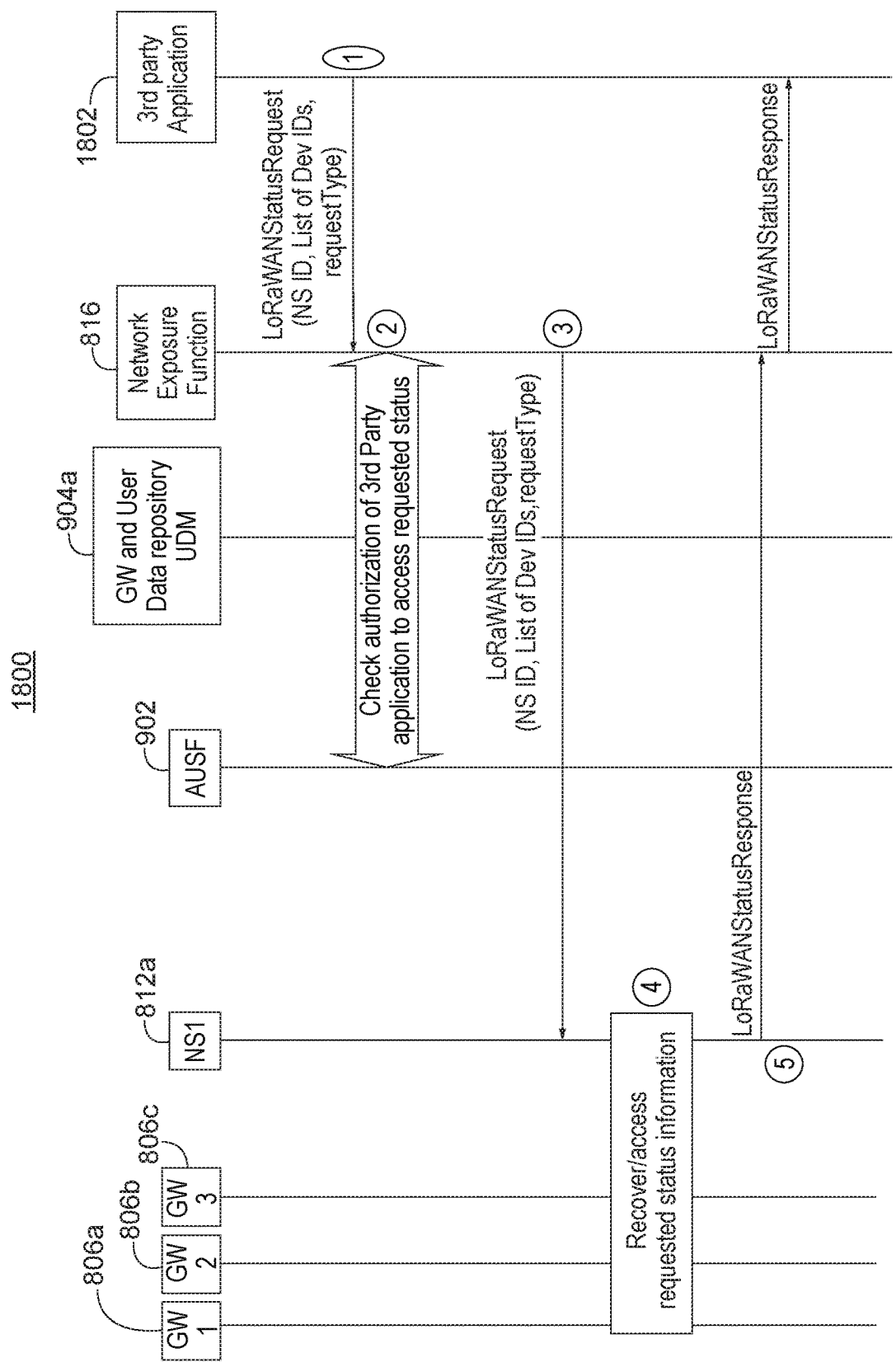
FIG. 18 is call flow for a third party application to use a network exposure function to retrieve a LoRaWAN status or an end node status in accordance with an example embodiment.

Referring now to FIG. 18, an example system 1800 is depicted in which a third party application 1802 uses the network exposure function 816 to retrieve LoRaWAN network status or end node status. At 1, in accordance with the illustrated example, the third party application 1802 issues a Status request (e.g., LoRaWANStatusRequest) to the network exposure function (NEF) 816. The command at 1 may include an identity of the targeted network server(s), the device IDs for the list of targeted end nodes, and/or a request type. Example request types include, presented without limitation:

NetworkServerStatus: the third party application 1802 is requesting the status of the targeted network servers

812. This may include the number of end nodes they are serving, the number of outstanding UL and DL packets stored in the network server, the traffics statistics for UL and DL transmissions, etc.

endNodeLinkQuality: the link quality for the list of targeted end nodes 814.

endNodeDataRate: the data rate currently configured for the list of targeted end nodes 814.

endNodeTxPower: the current transmit power for the list of targeted end nodes.

endNodeRepetitionRate: the current repetition rate for the list of targeted end nodes.

Thus, an apparatus comprising the NEF may receive a status request from a third party application, and the status request may indicate at least one of a targeted network server of a low power wide area network (LPWAN), an identity of one or more targeted end nodes in the LPWAN, and a request type. The request type may include, for example, a request for a number of end nodes that the targeted network server is serving, a request for a number of outstanding uplink and downlink packets stored in the targeted network server, a request for statistics associated with uplink and downlink transmissions from the targeted network server, a request for a link quality associated with the one or more targeted end nodes, a request for a data rate configured for the one or more targeted end nodes, a transmit power associated with the one or more targeted end nodes, or a request for a repetition rate associated with the one or more targeted end nodes.

Still referring to FIG. 18, at 2, the NEF 816 may verify that the third party application 1802 is allowed to access the information indicated in the status request. At 3, if the third party application 1802 is allowed to access the requested information, the NEF 816 may forward the status request to the targeted network server(s) 812, for instance the network server 812*a*. At 4, in accordance with the illustrated example, the network server 812*a* retrieves the requested information. In some cases, the network server 812*a* may need to perform an exchange with the UDM/UDR 904*a* to retrieve certain information. At 5, the network server 812*a* responds to the status request with a status response (e.g., LoRaWANStatusResponse).

Figure 23:
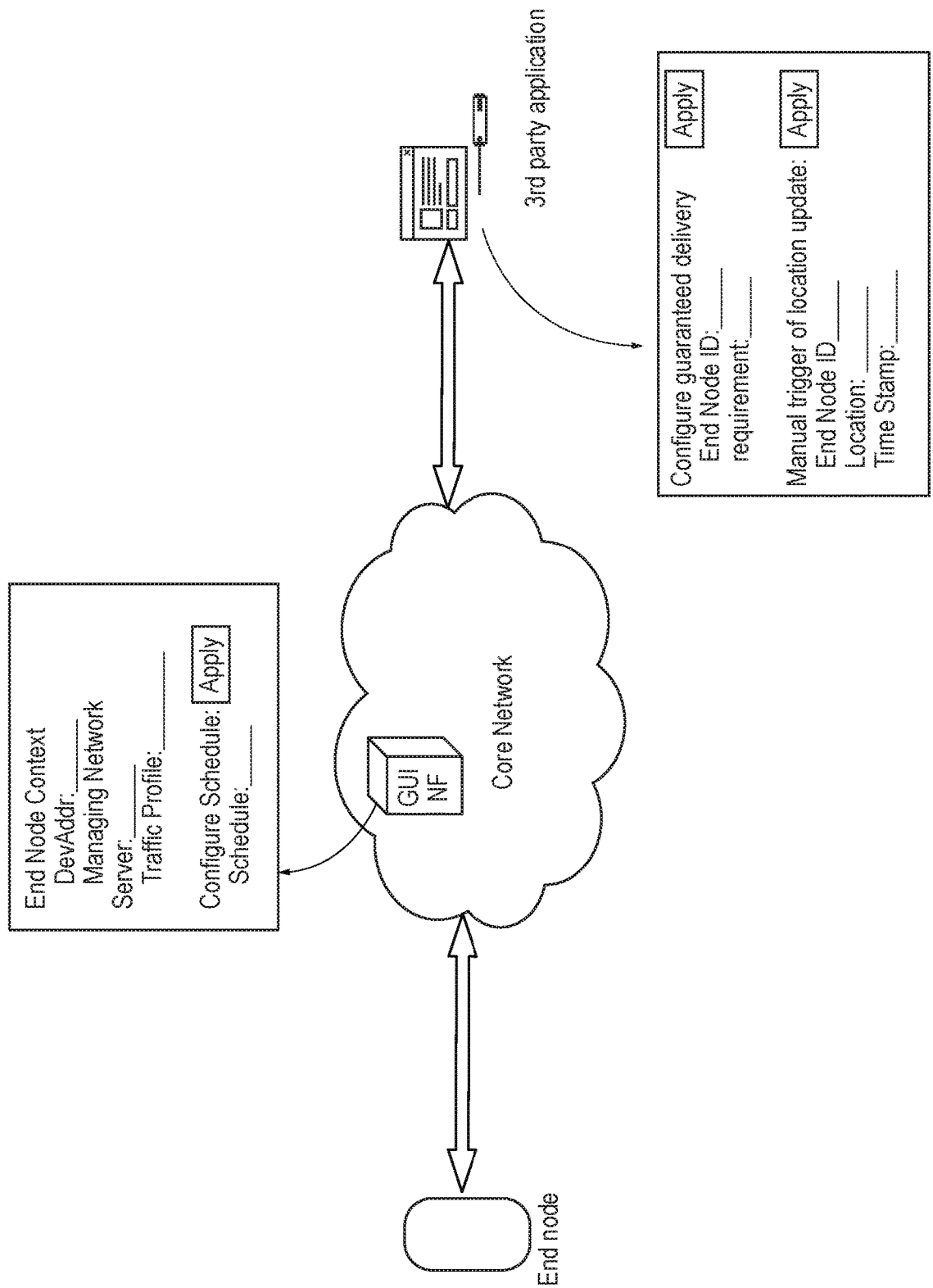
FIG. 23 depicts example graphical user interfaces (GUIs) used by the core network or a third party application.

Turning now to FIG. 23, a graphical user interface (GUI) may be implemented within the core network, and/or at the third party application. FIG. 23 depicts an example with two GUIs, though it will be understood that any number of GUIs, and any GUI design, may be implemented as desired. For example, the GUIs may be used to trigger certain actions described herein, and/or to view status related to the LoRaWAN network. It will be understood that the above examples of triggering and monitoring are not exhaustive, and the third party application or the core network may make other determinations or verifications using the GUI as desired. Thus, it will be further understood that the GUIs can provide a user with various information in which the user is interested via a variety of charts or alternative visual depictions.

By way of example and without limitation, the GUI may be used at a given third party application to manually trigger a location update for the end node, display the location information (e.g., including the associated time stamp) of an end node, or configure the guaranteed delivery requirements of an end node. Within the core network, the GUI may be implemented as a network function that has access to the other network functions. The GUI may be used to, for example and without limitation, query and display the LoRaWAN network context of an end node, configure the schedule for the channel, or view the location of an end node.

FIGS. 8-18 and the description related thereto illustrate various embodiments of methods and apparatuses for interworking LPWAN end nodes. In these figures, particularly FIGS. 9-13 and 15-18, various steps or operations are shown being performed by one or more nodes, devices, functions, or networks. It is understood that the nodes, devices, functions, or networks illustrated in these figures may represent logical entities in a communication network and may be implemented in the form of software (e.g., computer-executable instructions) stored in a memory of, and executing on a processor of, a node of such network, which may comprise one of the general architectures illustrated in FIG. 19 or 20 described below. That is, the methods illustrated in FIGS. 9-13 and 15-18 may be implemented in the form of software (e.g., computer-executable instructions) stored in a memory of a network node or apparatus, such as for example the node or computer system illustrated in FIG. 21 or 22, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 21 and 22, respectively) of the node under control of the processor of the node and the computer-executable instructions (e.g., software) that it executes.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 19:
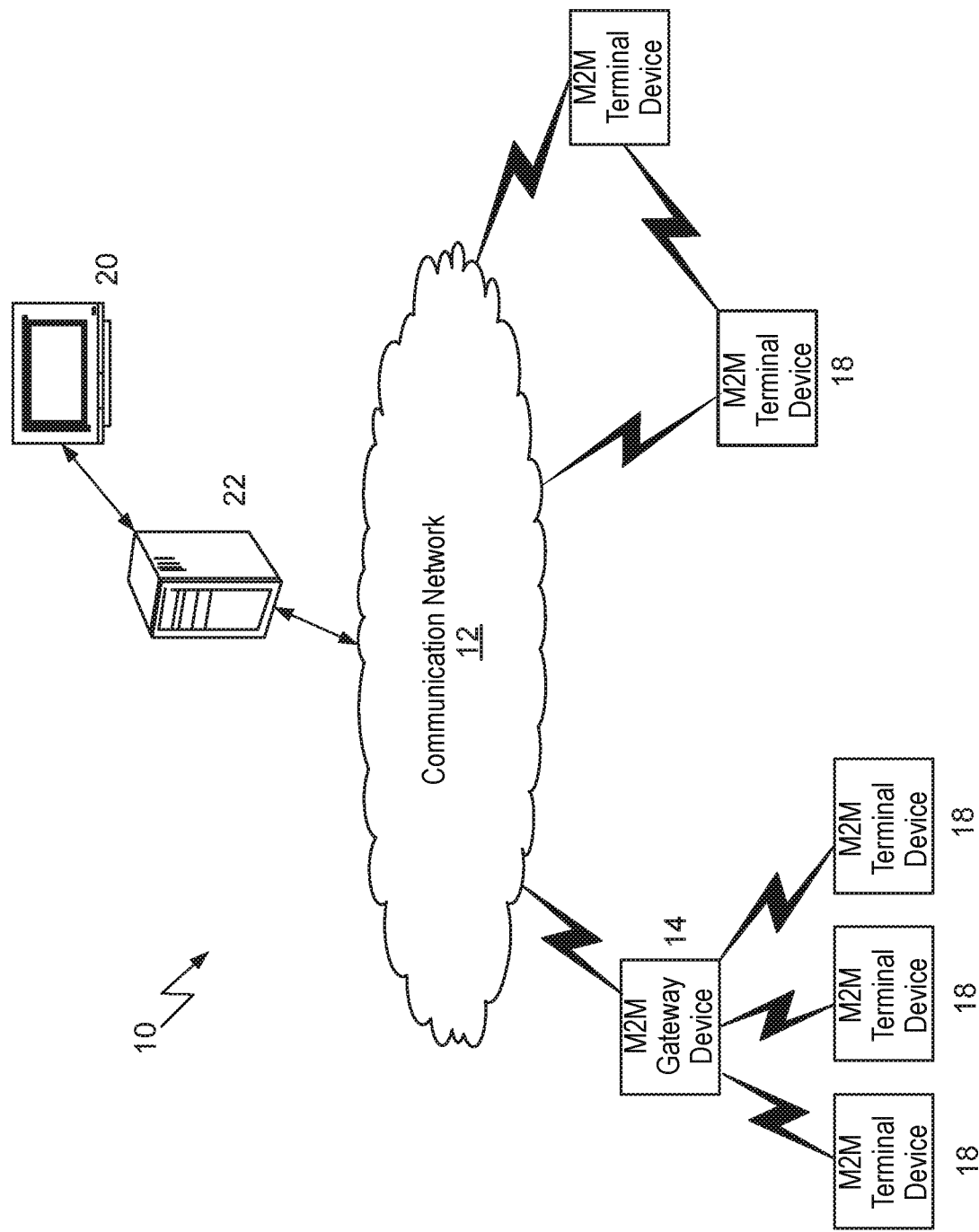
FIG. 19 is a system diagram of an example machine-to-machine (M2M), Internet of Things (IoT), or Web of Things (WoT) communication system in which one or more disclosed embodiments may be implemented.

FIG. 19 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 9-13 and 15-18 may comprise a node of a communication system, such as the ones illustrated in FIG. 1, 6-8, 19, or 20.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 19, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 19, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 20:
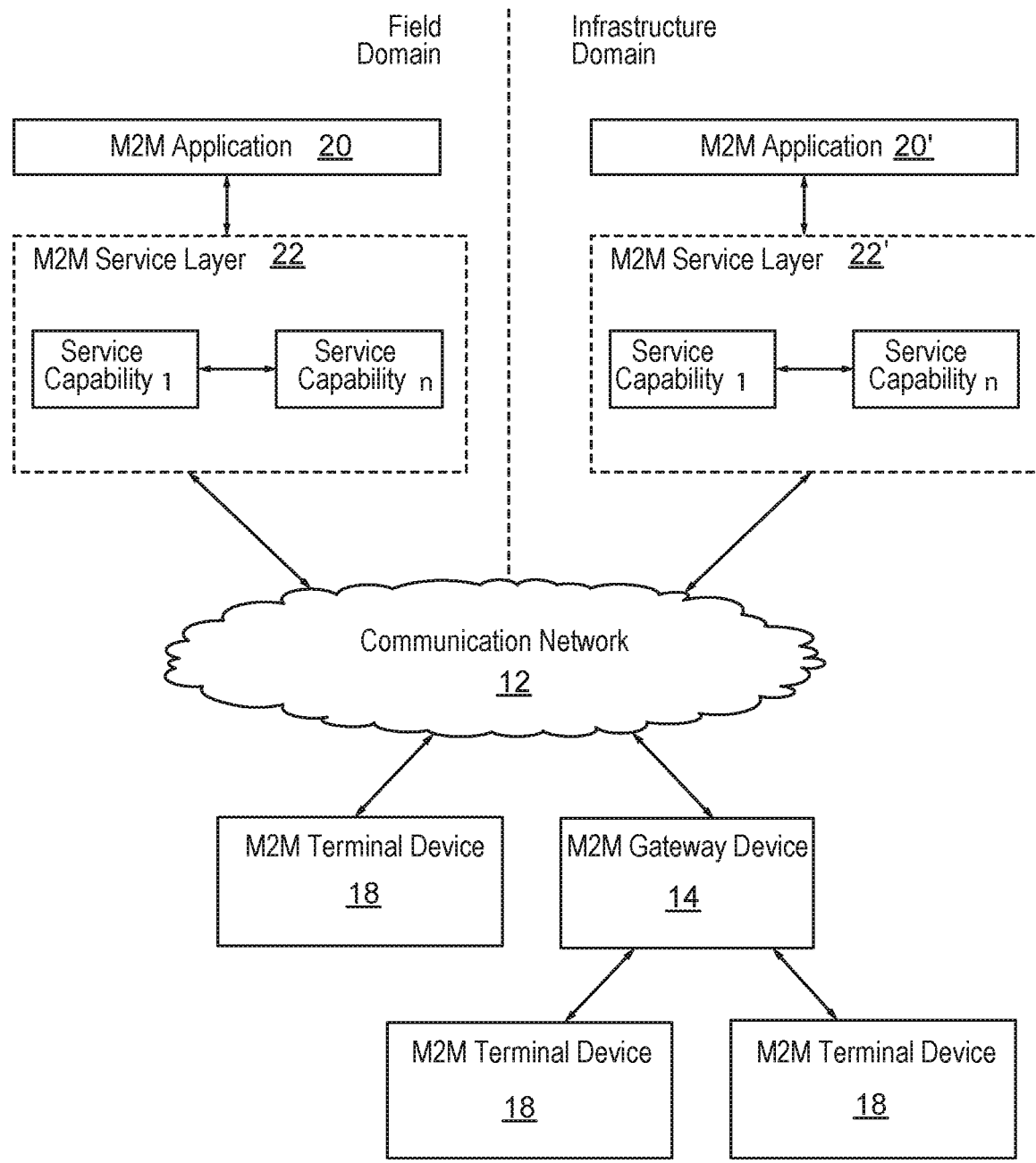
FIG. 20 is a system diagram of an example architecture that may be used within the M2M/IoT/WoT communications system illustrated in FIG. 19.

Referring to FIG. 20, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 20, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 20, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 21 or FIG. 22 described below.

Further, the methods and functionalities described herein may be implemented as part of an M2M network that uses a Service Oriented Architecture (SOA) and/or a Resource-Oriented Architecture (ROA) to access services.

Figure 21:
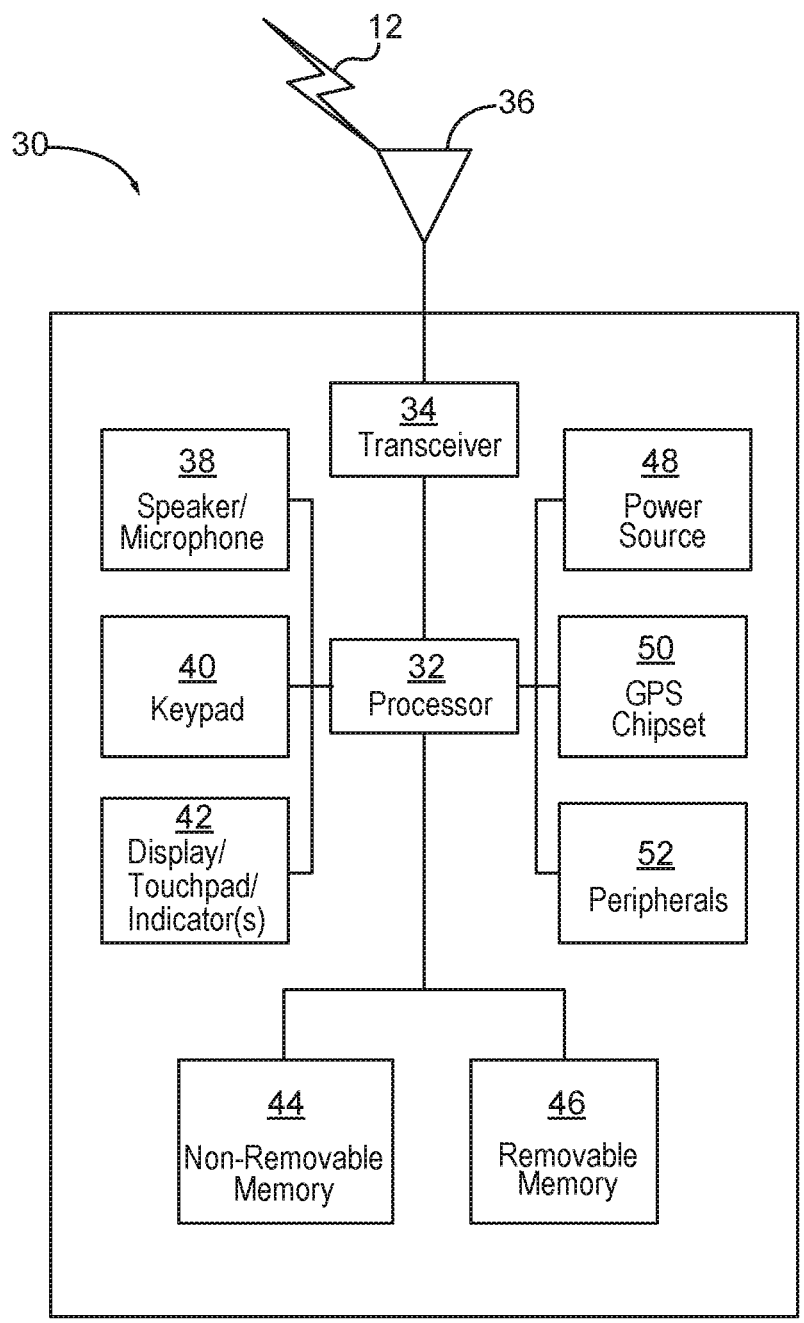
FIG. 21 is a system diagram of an example communication network node, such as an M2M/IoT/WoT device, gateway, or server that may be used within the communications system illustrated in FIGS. 19 and 20.

FIG. 21 is a block diagram of an example hardware/software architecture of a node of a network, such as one of the clients, servers, or proxies illustrated in FIGS. 9-13 and 15-20, which may operate as an M2M server, gateway, device, or other node in an M2M network such as that illustrated in FIG. 1, 6-8, 19, or 20. As shown in FIG. 21, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements interworking, e.g., in relation to the methods described in reference to FIGS. 9-13 and 15-18, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 21, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the interworking steps herein, e.g., in relation to FIGS. 9-13 and 15-18, or in a claim. While FIG. 21 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 21 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 22:
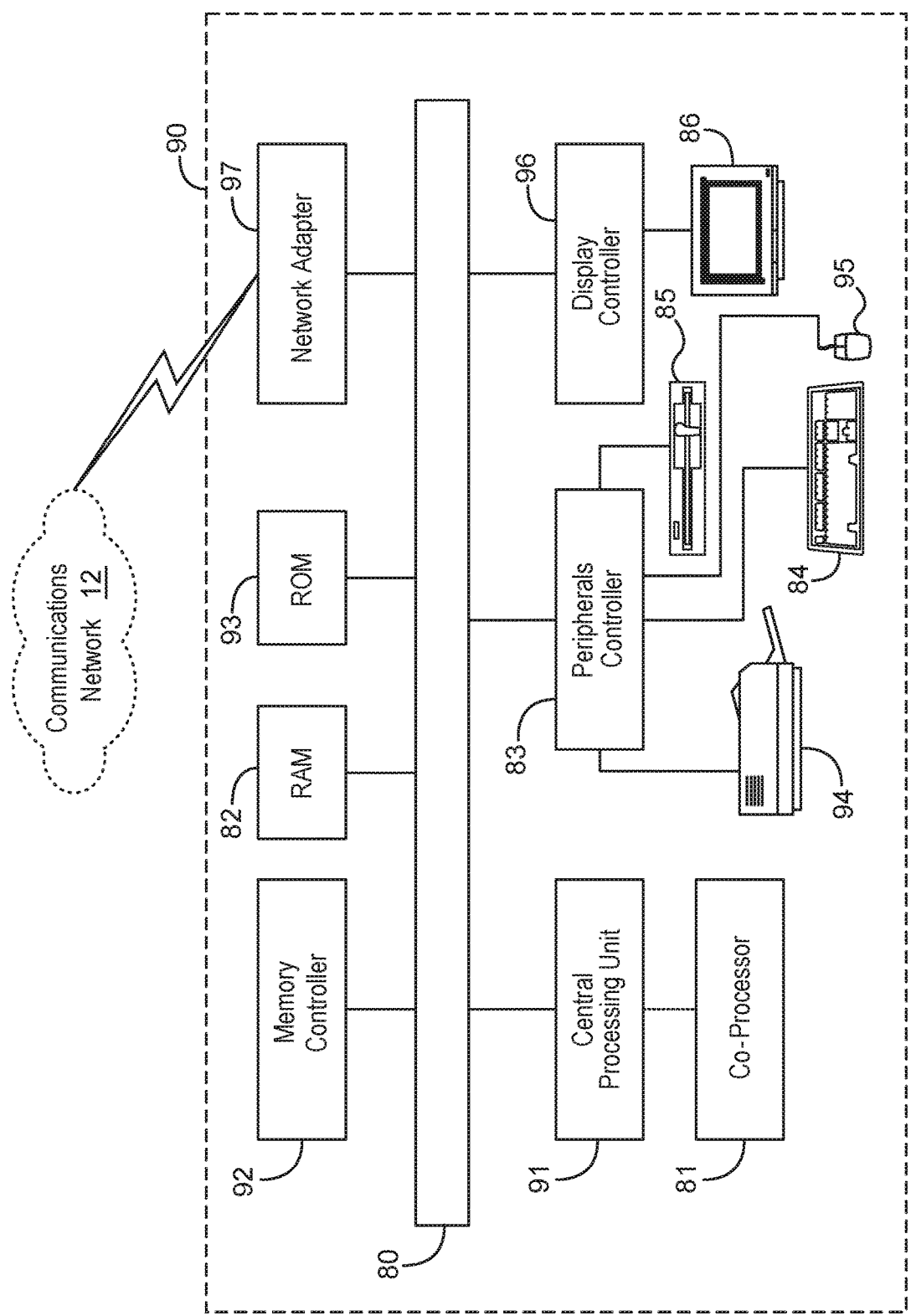
FIG. 22 is a block diagram of an example computing system in which a node of the communication system of FIGS. 19 and 20 may be embodied.

FIG. 22 is a block diagram of an exemplary computing system 90 which may also be used to implement one or more nodes of a network, such as the clients, servers, or proxies illustrated in FIGS. 9-13 and 15-18, which may operate as an M2M server, gateway, device, or other node in an M2M network such as that illustrated in FIG. 1, 6-8, 19, or 20.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for interworking LPWAN end nodes.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 19-23, to enable the computing system 90 to communicate with other nodes of the network. The communication circuitry, alone or in combination with the CPU 91, may be used to perform the transmitting and receiving steps described herein (e.g., in FIGS. 9-13 and 15-18) and in the claims.

The following is a list of acronyms relating to technologies that may appear in the above description. Unless otherwise specified, the acronyms used herein refer to the corresponding term listed below.

AppEUI Application EUI
AppKey Application Key
AF Application Function
AMF Core Access and Mobility Management Function
AN Access Network
AUSF Authentication Server Function
CN Core Network
CRC Cyclic Redundancy Check
CSS Chirp Spread Spectrum
DevAddr Device Address
DevEUI Device EUI
DL Downlink
DN Data Network
EN End Node
eNB evolved Node B
EUI Extended Unique Identifier
GPS Global Positioning System
GW Gateway
IoT Internet of Things
IP Internet Protocol
LOC Location
LPWAN Low-Power Wide Area Network
LoRa Long Range
LoRaWAN LoRa Wide Area Network
M2M Machine-to-Machine MAC Media Access Control
NEF Network Exposure Function
NF Network Function
NIDD Non-IP Data delivery
NMF Network Management Function
NS Network Server
NwkAddr Network Address
QoS Quality of Service
RAN Radio Access Network
RSS Received Signal Strength
RX1/RX2 LoRaWAN Receive Window
TUPF Terminating User Plane Function
UDM Unified Data Management
UDP User Datagram Protocol
UE User Equipment
UL Uplink
URI Uniform Resource Identifier In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. An apparatus comprising a processor, a memory, and communication circuitry, the apparatus being connected to a low power wide area network (LPWAN) via its communication circuitry, the apparatus further comprising computer-executable instructions stored in the memory of the apparatus which, when executed by the processor of the apparatus, cause the apparatus to perform operations comprising:
    receiving a join request, via a gateway, from an end node, wherein the join request comprises an indication of a class of the end node; and
    determining, based on the join request and the class of the end node, a network server to manage the end node.

2. The apparatus as recited in claim 1, wherein the join request includes an indication of the network server that is preferred by the end node.

3. The apparatus as recited in claim 1, wherein the apparatus further comprises computer-executable instructions which, when executed by the processor of the apparatus, cause the apparatus to perform further operations comprising:
    receiving the join request, via a plurality of gateways, from the end node;
    receiving a received signal strength (RSS) indication from each of the plurality of gateways such that each gateway is associated with a respective RSS;
    based on the RSS indications, selecting a gateway from the plurality of gateways to serve the end node; and
    sending a join accept message, via the selected gateway, to the end node during a receive window of the end node.

4. The apparatus as recited in claim 3, wherein the apparatus further comprises computer-executable instructions which, when executed by the processor of the apparatus, cause the apparatus to perform further operations comprising:
    based on the join request, sending an uplink report to a location management network function, wherein location information associated with the end node can be determined from the uplink report, and one or more network functions can subscribe to the location information.

5. The apparatus as recited in claim 1, wherein the network server is determined to manage the end node based on a load that is balanced across a plurality of network servers.

6. The apparatus as recited in claim 1, wherein the apparatus is a default network server, and the determined network server is a managing network server that is different from the default network server.

7. The apparatus as recited in claim 6, the operations further comprising:
    receiving a transmission from a second end node;
    after the network server is determined, determining whether the second end node has joined the LPWAN;
    if the second end node has already joined the LPWAN, forwarding the transmission from the end node to the managing network server; and
    if the second end node has not joined the LPWAN, processing the transmission.

8. An apparatus comprising a processor, a memory, and communication circuitry, the apparatus being connected to a low power wide area network (LPWAN) via its communication circuitry, the apparatus further comprising computer-executable instructions stored in the memory of the apparatus which, when executed by the processor of the apparatus, cause the apparatus to perform operations comprising:
    receiving a join request, via a gateway, from an end node, wherein the join request comprises an indication of a class of the end node;
    receiving, from a network management function, load target information associated with each network server in the LPWAN; and
    assigning, based on the join request, the class of the end node, and the load target information, a network server to manage the end node.

9. The apparatus as recited in claim 8, wherein the load target information is qualitative or associated with a numerical index.

10. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
    receiving a configuration request from a third party application, wherein the configuration request indicates a targeted network server of a low power wide area network (LPWAN), a request type, and a parameter associated with the request type;
    verifying that the third party application is allowed to configure the targeted network server of the LPWAN; and
    implementing the configuration request.

11. The apparatus as recited in claim 10, wherein the request type comprises a request to set the maximum aggregated transmit duty cycle of end nodes that have joined the network server, a request to set a frequency and a data rate for a receive window following each uplink transmission, a request to set a frequency used for beacon transmission, or a request to set a receive slot configuration.

12. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:

receiving a status request from a third party application, wherein the status request indicates a targeted network server of a low power wide area network (LPWAN), an identity of one or more targeted end nodes in the LPWAN, and a request type;

verifying that the third party application is allowed to access information indicated in the status request; and if the third party is successfully verified, forwarding the status request to the targeted network server.

13. The apparatus as recited in claim 12, wherein the request type comprises a request for a number of end nodes that the targeted network server is serving, a request for a number of outstanding uplink and downlink packets stored in the targeted network server, a request for statistics associated with uplink and downlink transmissions from the targeted network server, a request for a link quality associated with the one or more targeted end nodes, a request for a data rate configured for the one or more targeted end nodes, a transmit power associated with the one or more targeted end nodes, or a request for a repetition rate associated with the one or more targeted end nodes.

* * * * *